US006327459B2

(12) United States Patent
Redford et al.

(10) Patent No.: US 6,327,459 B2
(45) Date of Patent: Dec. 4, 2001

(54) REMOTE CONTROL WITH A DETACHABLE INSERT

(75) Inventors: Peter M. Redford, Los Gatos; Donald S. Stern, San Jose, both of CA (US)

(73) Assignee: TV Interactive Data Corporation, San Jose, CA (US)

( * ) Notice: Subject to any disclaimer, the term of this patent is extended or adjusted under 35 U.S.C. 154(b) by 0 days.

(21) Appl. No.: 09/013,329

(22) Filed: Jan. 26, 1998

Related U.S. Application Data

(63) Continuation-in-part of application No. 08/824,103, filed on Mar. 26, 1997, now abandoned, which is a continuation-in-part of application No. 08/818,558, filed on Mar. 14, 1997, now abandoned.

(51) Int. Cl.$^7$ ..................................................... G09B 5/00

(52) U.S. Cl. ..................... 434/307 R; 434/365; 463/1; 340/825.72; 348/734; 369/24

(58) Field of Search ..................... 341/22, 23; 345/173, 345/169, 168; 434/118, 169, 185, 307 R, 308, 317, 365; 348/7, 12, 476, 563, 601, 706, 731, 734, 738; 340/825.69, 825.72, 990; 369/24; 463/1, 5

(56) References Cited

U.S. PATENT DOCUMENTS

| | | |
|---|---|---|
| 4,021,932 | 5/1977 | Lipps . |
| 4,071,691 | 1/1978 | Pepper, Jr. . |
| 4,488,179 | * 12/1984 | Kruger et al. ..................... 348/706 |
| 4,587,378 | * 5/1986 | Moore ................................. 345/173 |
| 4,626,847 | 12/1986 | Zato . |
| 4,636,881 | 1/1987 | Brefka et al. . |
| 4,884,974 | 12/1989 | DeSmet . |
| 4,897,511 | * 1/1990 | Itaya et al. ....................... 178/18.05 |

(List continued on next page.)

FOREIGN PATENT DOCUMENTS

| | | |
|---|---|---|
| 61-137797 | 6/1986 | (JP) . |
| 63-213016 | 9/1988 | (JP) . |
| 4-104699 | 4/1992 | (JP) . |

OTHER PUBLICATIONS

*The 101 Cruise Caper*, Disney Enterprises, Inc. 1996 Hasbro, Inc, Pawtucket, RI, 23 pages.

Primary Examiner—Joe H. Cheng
(74) Attorney, Agent, or Firm—Skjerven Morrill MacPherson LLP

(57) ABSTRACT

A remote control includes a base and an insert that is attached in a detachable manner to the base. The base includes a remote control circuit, a button coupled to operate the remote control circuit and a fastener capable of holding the insert. The insert includes a printed publication (such as a card, a sheet of paper or a booklet) containing at least one leaf having human-understandable content (such as text and/or graphics). To assemble the remote control, a user attaches the insert to the fastener, so that the human-understandable content is laid over the button. Thereafter, when the user operates the button (e.g. by touching the leaf), the base transmits a remote control signal that causes a host device to visually display information related to the human-understandable content at the touched location. A base in the form of a three ring binder gives the user an intuitive feel of simply touching human-understandable content on a leaf in the binder to view a display of information related to the content. In addition to the human-understandable content, the insert can carry a predetermined pattern that can be sensed by a sensor during mounting of the insert on the base. The base transmits, in the remote control signal, a number determined from the redetermined pattern thereby to indicate to the host device the insert currently in the base.

6 Claims, 26 Drawing Sheets

Microfiche Appendix Included
(18 Microfiche, 1138 Pages)

U.S. PATENT DOCUMENTS

| | | | |
|---|---|---|---|
| 4,963,702 | * 10/1990 | Yaniger et al. | 178/28 |
| 4,990,092 | 2/1991 | Cummings . | |
| 5,008,497 | * 4/1991 | Asher | 178/18.05 |
| 5,059,126 | 10/1991 | Kimball . | |
| 5,073,931 | 12/1991 | Audebert et al. . | |
| 5,093,718 | * 3/1992 | Hoarty et al. | 348/7 |
| 5,235,328 | 8/1993 | Kurita . | |
| 5,248,164 | * 9/1993 | Lepretre | 281/22 |
| 5,290,190 | 3/1994 | McClanahan . | |
| 5,319,455 | 6/1994 | Hoarty et al. . | |
| 5,368,488 | 11/1994 | Gentile . | |
| 5,374,195 | 12/1994 | McClanahan . | |
| 5,404,444 | 4/1995 | Billings . | |
| 5,417,575 | * 5/1995 | McTaggart | 434/317 |
| 5,419,705 | 5/1995 | Sandvik . | |
| 5,457,780 | 10/1995 | Shaw et al. . | |
| 5,545,857 | 8/1996 | Lee et al. . | |
| 5,567,163 | 10/1996 | Ku . | |
| 5,569,549 | * 10/1996 | Redford | 429/1 |
| 5,597,307 | 1/1997 | Redford et al. . | |
| 5,604,544 | * 2/1997 | Bertram | 348/563 X |
| 5,624,265 | 4/1997 | Redford et al. . | |
| 5,757,304 | * 5/1998 | Redford et al. | 341/173 |
| 5,807,176 | * 9/1998 | Forsse et al. | 434/317 X |
| 5,810,604 | * 9/1998 | Kopp, Jr. et al. | 424/317 |

* cited by examiner

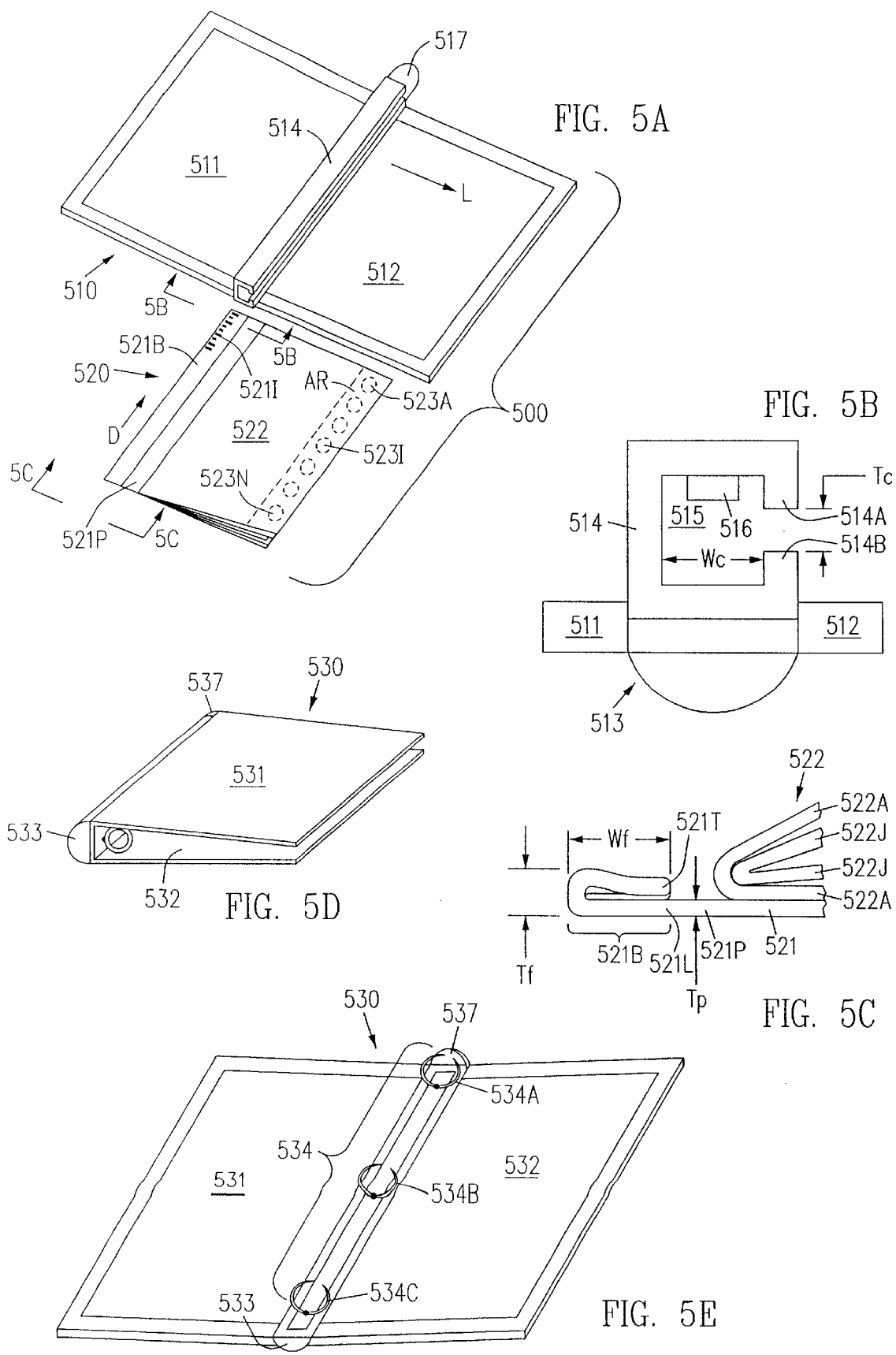

REMOTE CONTROL WITH A DETACHABLE INSERT

CROSS-REFERENCE TO RELATED APPLICATIONS

This application is a continuation-in-part application of U.S. patent application Ser. No. 08/824,103 filed on Mar. 26, 1997, currently abandoned, that is in turn a continuation-in-part application of U.S. patent application Ser. No. 08/818,558 filed on Mar. 14, 1997, currently abandoned, both of which are incorporated by reference herein in their entirety.

This application is also related to the following copending, commonly owned U.S. Patent Applications that are incorporated by reference herein in their entirety:

Ser. No. 08/715,809, currently abandoned;

Ser. No. 08/497,177, now U.S. Pat. No. 5,711,672, issued on Jan. 27, 1998;

Ser. No. 08/550,976, now U.S. Pat. No. 5,839,905, issued on Nov. 24, 1998, a divisional of Ser. No. 08/269,492, now U.S. Pat. No. 5,624,265;

Ser. No. 08/692,994, now U.S. Pat. No. 5,763,112, issued on Jun. 9, 1998, that is a continuation of Ser. No. 08/405,645, now U.S. Pat. No. 5,569,549;

Ser. No. 08/630,015, now U.S. Pat. No. 5,818,037, issued on Oct. 6, 1998;

Ser. No. 08/916,780 currently abandoned, and Ser. No. 08/915,072;

Ser. No. 08/908,833 filed Aug. 7, 1997, now U.S. Pat. No. 5,882,903, that is a file wrapper continuation of Ser. No. 08/298,648, currently abandoned, and Ser. No. 08/816,616, currently abandoned.

CROSS REFERENCE TO APPENDICES IN ATTACHED MICROFICHE

Appendices A–L which are a part of the present disclosure, are attached herewith in a microfiche consisting of a total of 18 sheets that contain a total of 1,138 frames.

Appendix A contains computer programs and related data for programming a microcontroller e.g. COP 820CJ available from National Semiconductor Corporation, 1090 Kifer Road, Sunnyvale, Calif. 94086, used in a remote control as described below. On being programmed by the computer programs of Appendix A, the microcontroller wakes up in response to a predetermined event and causes a signal transmitter to transmit a remote control signal carrying an identifier code that identifies, at least partially, the information to be displayed as described below. The computer programs of Appendix A can be compiled by the in-circuit simulator "ice MASTER COP8 Module" also available from National Semiconductor Corporation.

Appendix B describes an infrared protocol called "TVIR" used in the computer programs of Appendix A to encode the predetermined number in the remote control signal, and used in the computer programs of Appendix C to decode the number from the remote control signal.

Appendix C contains computer programs and related data for programming another microcontroller e.g. COP922C used in a signal receiver to extract data from a remote control signal and to pass the extracted data to a host device. The computer programs of Appendix C can also be compiled by the in-circuit simulator "ice MASTER COP8 Module" (described above).

Appendix D describes an architecture of the host device and the format of data supplied by the signal receiver to the host device using the well-known RS-232 signal interface.

Appendices E–G contain computer programs and related data for programming a host device including e.g. the microprocessor PENTIUM available from INTEL Corporation, Santa Clara, Calif., and the operating system WINDOWS 95 available from MICROSOFT Corporation, One Microsoft Way, Redmond, Wash. 98052. The computer programs of Appendices E–G cause the host device to respond to the identifier code received by the signal receiver by displaying information indicated by the identifier code. The computer programs of Appendices E–G can be compiled by the following programming tools available from MICROSOFT Corporation (at the above address) and well known to a person skilled in the art of programming host devices. For the assembly language and C language computer programs in Appendices E–G:

Assembler: MASM.EXE v. 5.01A (supplied with Microsoft Windows 3.1 DDK)

Compiler: CL.EXE v. 8.00C (MSVC 1.52c)

Linker: LINK.EXE v. 5.60.339 (MSVC 1.52c)

RC: RC.EXE v. 3.11 (MSVC 1.52c)

Implib: IMPLIB.EXE v. 1.50 (MSVC 1.52c)

Make: MAKE.EXE v. 4.07

For the VBX computer program in Appendix E (Pages 94–107):

Compiler: CL.EXE v. 8.00C (MSVC 1.52c)

Linker: LINK.EXE v. 5.60.339 (MSVC 1.52c)

RC: RC.EXE v. 3.11 (MSVC 1.52c)

Implib: IMPLIB.EXE v. 1.50 (MSVC 1.52c)

Make: NMAKE.EXE v. 1.40 (MSVC 1.52c)

Appendix H is a reference guide for a parameter file used by the computer program in Appendix I (described below).

Appendix I contains visual basic language computer program that causes a personal computer to receive the data from a remote control signal and display the selected information. The programs in Appendix I can be compiled by:

Microsoft Visual Basic v. 3.0 (professional edition)

Appendix J contains subroutines called by the software in Appendix F.

Appendix K contains Java code that can be compiled by:

Microsoft Visual J++ v.1.1 (Professional Edition)

Appendix L contains software used to translate an identification code received from a remote control into an Internet address used to retrieve and display the selected information.

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

FIELD OF THE INVENTION

This invention relates to an apparatus and method for the remote control of the display of information by an interactive media, such as a host device, e.g., a personal computer (PC) or a television (TV).

BACKGROUND

A conventional remote control for a television (TV) includes a rectangular box, with buttons that are marked with symbols, such as the numerals "1", "2" . . . "0". A user touches one or more such buttons to switch the TV's display to a desired channel. For example, the user instructs the TV to display channel 5 by pressing a button labeled "5".

However, the user performs several steps prior to the display: consults a TV guide, selects a desired program, remembers a channel number for the program, and enters the channel number on the remote control. Alternatively, the user presses a button labeled for example "CH+/−" to sequentially display each TV channel, until the user finds a desirable TV program.

Universal remote controls allow a user to control the operation of a video cassette player (VCR) in addition to the TV, e.g. to control a movie's retrieval by the VCR and display by the TV. However, the user again performs several steps prior to the display: reviews a list of available movies (for example by consulting an index in a movie rental store), selects and rents a desired movie's video tape, brings home and inserts the video tape into the VCR, tunes the TV to a predetermined channel, e.g. channel 3, and then presses a button labeled "PLAY" on the remote control.

A settop box available from VideoGuide, Inc., 209 Burlington Road, Bedford, Mass., 01730 (see the Web page at www.vgi.com on the Internet), displays on a user's TV a list of upcoming TV programs, and requires the user to press a button labeled "TV" to select one of the listed TV programs. See also the Web page at www.theGIST.com for another similar product.

A mouse and a keyboard for remotely controlling information displayed on a computer's monitor are also well known. The mouse and keyboard are more difficult to use than a TV remote control, because the user is required to be knowledgeable about computers. Specifically, the user must know computer instructions or be aware of the need to press, e.g., a left button of the mouse while a cursor is positioned on an icon.

SUMMARY OF THE INVENTION

A remote control in accordance with this invention includes a remote control base (also called simply "base"), and an insert that is attached in a detachable manner to the remote control base. The base includes (1) a support structure, (2) a remote control circuit supported by the support structure, and (3) a button also supported by the support structure and coupled to operate the remote control circuit. On operation of the button(s), the remote control circuit generates a signal that can control the operation of a host device, such as a personal computer (PC) or a television.

The insert includes a printed publication having one or more leaves that are printed with content such as text and graphics. A user assembles the remote control by physically attaching the insert to the base so that a leaf of the printed publication is laid over the button in the base. Thereafter, when the user touches content (e.g. text or graphics) located on the leaf (e.g. printed thereon or affixed by a sticker), pressure from the touch transfers through the leaf to operate the button and transmit a remote control signal (e.g. a "wireless signal" or a signal over a cable) to the host device.

The printed publication is attached to the base in a detachable manner so that the user can replace the attached printed publication with another printed publication, thereby to reuse the base any number of times. Detachable attachment of a printed publication to the remote control base allows the attached printed publication to be free of electronic components, and therefore be manufactured by conventional printing processes.

In a first embodiment, the insert includes, as the printed publication, a single leaf, e.g. a card (such as a postcard, a playing card, or a business card). In this embodiment, the base has the form of a normal remote control (e.g. length being several times width). The base includes a fastener formed by two "U" shaped channels that each face the other along the longitudinal side of the base. In this embodiment, the user assembles the remote control by sliding two opposite edges of a card within the two channels of the fastener until the card touches a portion (also called "stop member") of the base. Therefore, at the end of assembly, text and/or graphics carried in a central region of the card lie over a button that is located between the two channels.

Thereafter, when the user touches the text and/or graphics on the card, pressure from the touch operates the underlying button, and in response the remote control circuit generates and transmits a signal to the host device. The signal carries data (e.g. x and y coordinates) indicative of the touched location on the card. On receipt of the signal, the host device visually displays information related to the text and/or graphics at the touched location on the card. The touched location's text and/or graphics is related to (e.g. is descriptive of, or is derived from) the to-be-displayed information.

For example, touching the content "CHINA AIRLINES" of a card (when mounted on the base) generates a remote control signal that instructs a host device to automatically display electronic content accessible in the form of a page (also called "Web page") on the World Wide Web part of Internet at the address www.china-airlines.com. Such electronic content can be held in a storage media that is coupled to the host device by a server, for example, through a public or private network such as a telephone network, a satellite network, or a cable network. Alternatively, the electronic content can be held in a storage media that is packaged with the insert, and that is inserted into the host device by the user.

The information displayed by the host device, and the content carried by the insert have an association (hereinafter "remote electronic association") that is implemented by transmission of the signal generated by the remote control circuit. Moreover, there is a visual association between the insert's content and the underlying button implemented in one embodiment by the fastener (e.g. the above-described channels) that aligns the insert to the base.

In this embodiment, the alignment is sufficient to ensure that an insert is positioned at approximately the same position on the base each time the remote control is assembled, so that content on the insert is appropriately aligned to one or more buttons in the base. For example, the base has a distance (also called "width") between the two channels that is approximately equal to the width of an insert to be used in the base. Repeatability in the positioning of an insert with respect to the base ensures that approximately the same coordinates of a touched location are sensed by the underlying button(s), irrespective of the number of times or the way in which the insert is attached to the base.

In this particular embodiment, the card carries a pattern (e.g. formed as a bar code or a series of punched holes), and the remote control base includes an identity reader (e.g. formed by a series of sensors, such as photodiodes or phototransistors) that reads the pattern. The remote control circuit transmits in the signal a number determined by the identity reader from the pattern, thereby to uniquely identify to the host device the card currently attached to the base, so that the base can be reused any number of times with such cards.

A "card reader" remote control as described above allows a user to simply use a card (e.g. torn from a printed publication, such as the TIME™ magazine) to pull up a display of information on a host device. So such a remote control eliminates the need for a user to consult a guide (e.g. TV guide) and remember, e.g. a channel number or an Internet address as required in the prior art. Instead, the user simply touches human-understandable content located on a card mounted on the base, and pressure from the touch operates a button coupled to a remote control circuit that in turn transmits a signal (either wirelessly or over a cable) to control the display of related information.

In a second embodiment, the insert includes, as the printed publication, a booklet having a number of leaves (also called "sheets" or "pages"), e.g. a catalog or a magazine. In such an embodiment, the base includes a file folder having a front cover, a back cover and a spine connecting the two covers. The file folder includes, mounted on the spine, a fastener capable of detachably holding the insert. Such a fastener includes, e.g. three rings capable of holding a booklet having three corresponding holes. In this particular embodiment, each booklet initially holds a storage media, e.g. an optical disc (such as a CD-ROM) that is encoded with the information to be displayed in response to touching a region of the booklet when mounted in the remote control base.

Instead of a booklet, in an alternative embodiment the three-ring fastener holds a single sheet of paper having the three corresponding holes. Therefore, a remote control having the three ring fastener can be used with printed publications having either: (a) single leaf or (b) multiple leaves.

In other embodiments, instead of a three-ring fastener, other types of fasteners are used, e.g. a female rail having a "C" shaped cross-section that can hold a single leaf. Such a single leaf can support a booklet, thereby allowing a remote control having the rail to be used with multiple leaves in a printed publication. Moreover, in one variant of the card reader remote control, the card supports a booklet thereby to make leaves in the booklet touch sensitive.

A remote control as described herein has several unexpected advantages. For example, as an insert is mounted removably on a remote control base, the base can be reused any number of times, thereby resulting in lower cost than if a remote control circuit is integrated into the insert. Therefore, inserts can be manufactured by conventional printing processes. Furthermore, a remote control as described herein allows the display of electronic content on a bulky device (such as a TV or a PC) located at a distance from the remote control, thereby allowing a user to simply touch a mounted card and view a display of information related to content carried by the card.

Furthermore, the above-described file-folder remote control is compatible with the standard three-hole format of normal catalogs. Therefore normal catalogs can be modified for use in a file-folder remote control by simply providing a mark on each touch-sensitive leaf of the catalog, thereby to allow a user to identify to a host device the leaf that is currently laid open.

Also, the form of a file-folder remote control provides the user with a level of comfort due to familiar appearance that is otherwise lacking in a remote control of the prior art. Specifically, a user can flip through the leaves of a printed publication in the normal manner, and when desired merely touch appropriate locations to pull up the display of related information. Moreover, a user can easily access information related to the printed content on two adjacent leaves that are laid open, with a first leaf laid over a front cover and a second leaf laid over a back cover.

Therefore, a printed publication when mounted in the file folder remote control can be laid open and touched in the normal manner of a book. Furthermore, printed content on both sides of a leaf can be used to select information, e.g. by using a back cover for one side, simply turning over the leaf and using the front cover for the other side. Such a file folder remote control having a button in each of a front cover and a back cover eliminates the need to remove and re-insert a leaf as required by the card-reader remote control. Also, the file-folder remote control does not have an identity reader, and is therefore cheaper than the card-reader remote control.

In a third embodiment, a remote control includes features of both the above-described remote controls of the first and second embodiment. Specifically, in one implementation, the remote control includes a file folder with a fastener in the form of a female rail having a "C" shaped cross section, with a barcode scanner mounted in a cavity of the rail. In this particular embodiment, the insert includes a leaf on which is mounted a booklet, with a portion (also called "flap") of the leaf forming a male rail. The mail rail carries a barcode to be read by the scanner during insertion of the male rail into the cavity of the female rail.

A remote control base as described herein can include one or more additional input devices, e.g.

(1) a pointing device (such as a touch pad, a mouse, a trackball, or a joystick) that controls the movement of a cursor on a monitor of the host device, and/or (2) an alphanumeric device (such as a keyboard) that allows a user to type in, for example, a search word related to the displayed information, thereby to pull up additional information related to the specific content carried by the insert.

BRIEF DESCRIPTION OF THE DRAWINGS

FIG. 5A illustrates, in a perspective view, a file-folder shaped remote control that includes a female rail at the spine, and an insert with a flap for insertion into the rail.

FIG. 5B illustrates, in an elevation view in the direction 5B—5B in FIG. 5A, a "C" shaped cross-section of the rail.

FIG. 5C illustrates, an elevation view in the direction 5C—5C in FIG. 5A, a male rail formed by folding over a portion of the flap.

FIGS. 5D and 5E illustrate, in perspective views, a file-folder shaped base in closed and open positions respectively.

DETAILED DESCRIPTION

Figure 1:
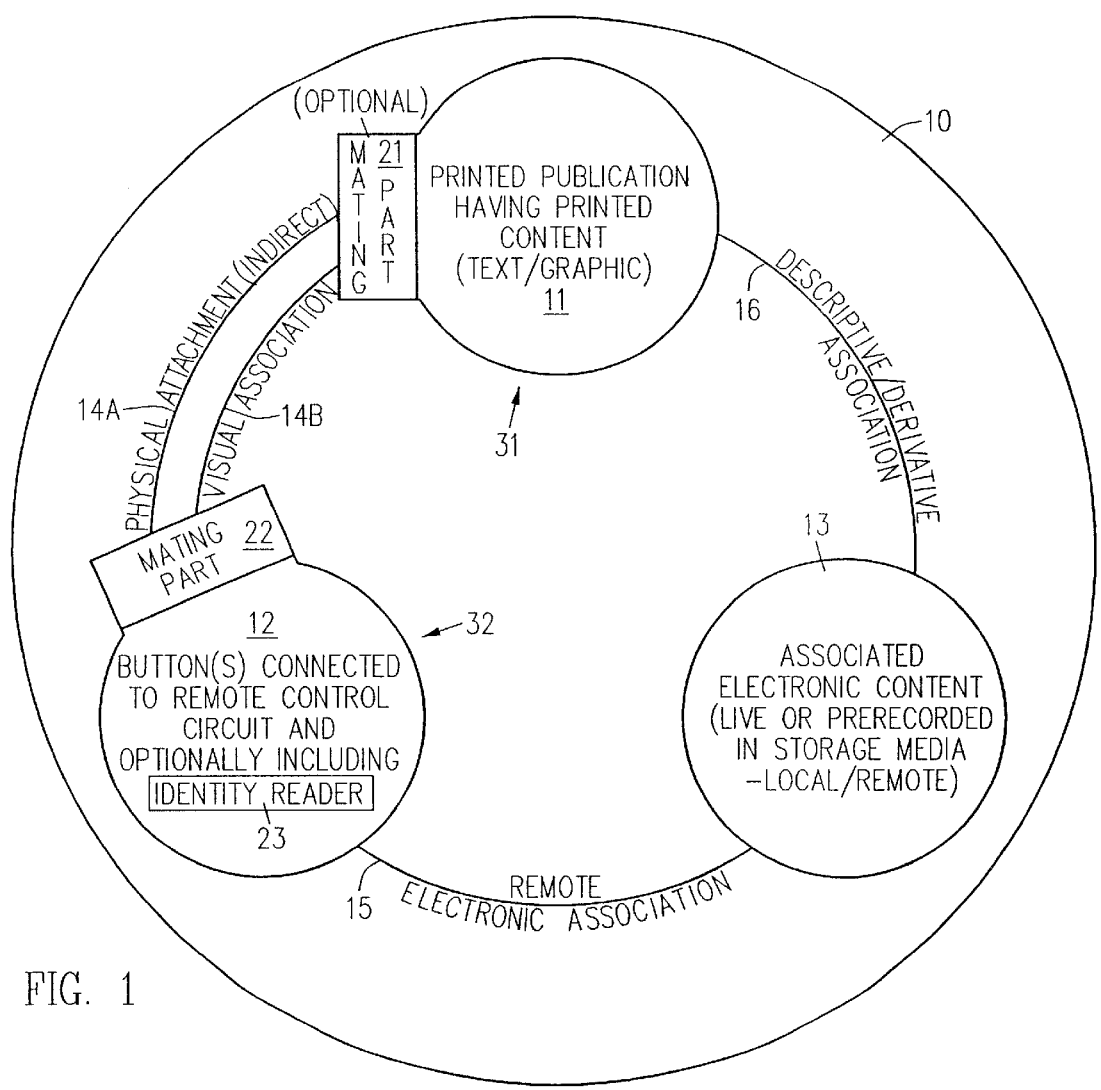
FIG. 1 illustrates, in a conceptual view, a remote control of this invention for controlling the display of information (also called "electronic content").

In the conceptual view of FIG. 1, a remote control 10 includes at least two parts: a base 32 that includes a remote control circuit, and an insert 31 that includes a printed publication. Insert 31 is physically attached (as illustrated by physical attachment 14A) indirectly by a fastener (not labeled; illustrated by mating part 22) to base 32. Base 32 includes, in addition to the remote control circuit, one or more buttons 12 that operate the remote control circuit.

The printed publication of insert 31 has the appearance of a normal periodical, journal, or magazine, and has content, such as text and/or graphics printed on one or more leaves included in the printed publication. For example, the printed publication can have the appearance (e.g. size and shape) of (1) a postcard, (2) a business card, (3) a playing card of a card game (such as poker), (4) a sheet of paper of dimensions 8 inches×10 inches (5) a greeting card, and (6) a booklet having three holes (such as a catalog).

When a user touches predetermined areas in the printed publication, pressure from the touch transfers through the leaves to a button 12, thereby to operate the remote control circuit and cause transmission of a signal (illustrated by remote electronic association 15) indicative of a location touched by the user. In response to the signal, a host device 120 (FIG. 3A), such as a personal computer (PC) or a television (TV) optionally suspends displaying any information currently displayed (e.g. saves state of all processes), and displays information in the form of electronic content 13 (FIG. 1) associated with (as illustrated by association 16) printed content at the touched location.

In one embodiment, electronic content 13 is "data specific", and button 12 is a "data button", as described briefly below and in detail in the U.S. patent application Ser. No. 08/550,976 incorporated by reference above. The host device can be similar or identical to the host device described in detail in one or more of U.S. patent applications Ser. Nos. 08/550,976, 08/816,616 and 08/915,072 also referenced above.

Button 12 can be any device capable of transmitting an electrical signal in response to pressure. Examples of button 12 include a membrane switch and a touch panel. Operation of button 12 (in one embodiment) indicates that specific electronic content including data (and optionally including code) is to be retrieved from a network (either live content from e.g. a video camera or prerecorded content from a remote storage media) or a local storage media in the host device, and is to be displayed to the user by the host device.

An example of a data button is a button that when pressed causes a display (by the host device) of a list of automobiles sold by the FORD™ Motor Company, and is triggered by the user pressing a printed publication 11, e.g. on content "Ford" carried by a leaf of printed publication 11. Therefore, in this example, electronic content 13 is "data specific" and includes a listing of automobiles sold by FORD™. Association 16 (also called "representative association") is implemented by a publisher making available (e.g. over the Internet or on an optical disc) electronic content 13 for display by a host device in response to operation of button 12.

Yet another example of a data button is a button that when pressed causes the display of a Presidential address being delivered in real time, when the user presses the printed content "Presidential Address" in a leaf of printed publication 11, if the Presidential address is currently being delivered by the President. If the user presses the printed content "Presidential Address" after the live broadcast, i.e. after the President has finished addressing the nation, a recording of the most recent Presidential address is retrieved from a remote storage media and displayed to the user by the host device. The displayed information, such as live content or prerecorded content can be retrieved from any network such as a telephone network, a satellite network or a cable network.

Visual association 14B (FIG. 1) is implemented when insert 31 is aligned to base 32, in one embodiment when the printed content in insert 31 is located at a predetermined location relative to one or more buttons 12 in base 32. The alignment between a leaf's printed content and button 12 is sufficient to ensure that operation of button 12 causes the host device to pull up and display electronic content 13 (FIG. 1) that is associated with the printed content (e.g. by association 16 as described above).

Therefore, visual association 14B is substantially similar to visual association 14B described in the U.S. patent application Ser. No. 08/550,976 incorporated by reference above, except that the printed text and/or graphic content is not integrated into button 12 and rather is located on a leaf of printed publication 11 that is attached in a detachable manner to base 32.

In one embodiment, printed publication 11 consists of only one leaf (for convenience such a leaf is also identified by reference numeral 11). In this embodiment, leaf 11 is formed as a portion of a magazine, and the user tears out leaf 11 from the magazine, and detachably attaches leaf 11 to remote control base 32. In another embodiment, such a leaf 11 is simply included loosely in a magazine, thereby eliminating the requirement for the user to tear out the leaf. Such a leaf 11 can be similar or identical to a "Reader Response Card" commonly included in a magazine (such as the "TIME" magazine) for requesting information on products advertised in the magazine. Furthermore, in yet another embodiment, the user receives leaf 11 by itself in the mail, in a manner similar to a picture postcard, or alternatively in an envelope that contains a bill, such as the Visa™ bill.

An insert 31 (FIG. 1) can include, in addition to leaf 11, a printed publication that has one or more covers (e.g., front and back covers) and leaves (in addition to the above-described leaf 11) enclosed between the covers. Such leaves also carry text and graphics of a magazine, (e.g. the TIME™ magazine) in the normal manner. In one such an embodiment, leaf 11 is attached as a flap to the printed publication, and leaf 11 is detachably attached to base 32 without separation from the printed publication.

In one implementation, leaf 11 carries a pattern containing an identification code in the form of e.g. a bar code (such as the code "UPC") that is printed on leaf 11 in a manner similar to a bar code located below the mailing address on a preprinted post card. Such a pattern, when carried by leaf 11, is read by an identity reader 23 (e.g. a bar code scanner) that is optionally included in base 32.

In an alternative implementation, leaf 11 carries a pattern in the form of a series of holes that are punched in leaf 11 in a manner similar to the holes of punched cards that were conventionally used to program a computer. However, in other implementations, a leaf 11 can carry an identification code in another structure, e.g. encoded in a magnetic stripe or in an electronic chip, and identity reader 23 includes an appropriate circuit capable of reading the identification code from such a structure. In yet another implementation, the identification code is held in a memory in the remote control circuit, thereby eliminating the need for identity reader 23 and the need for a pattern to be carried by leaf 11.

Figure 2A:
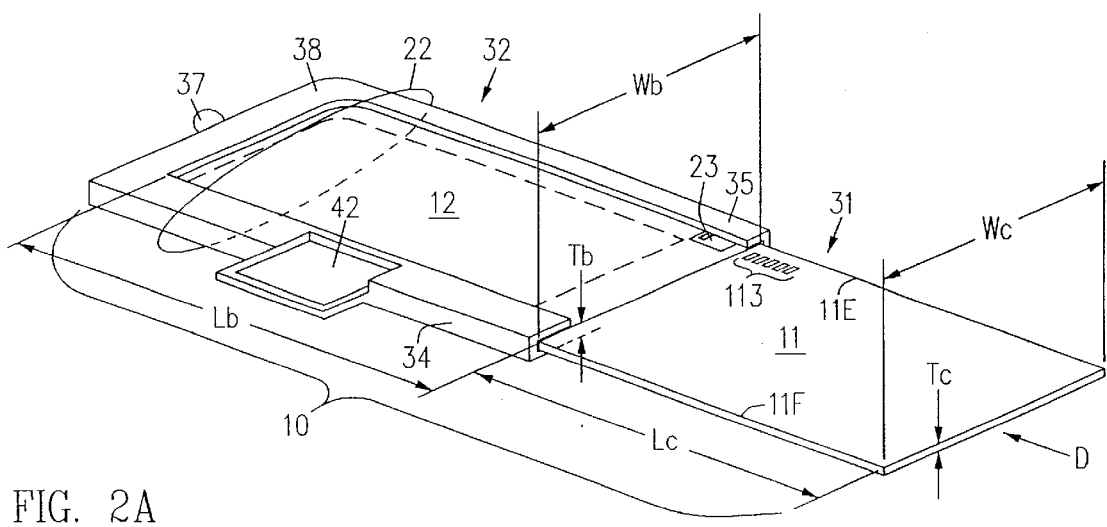
FIG. 2A illustrates, in a perspective view, one embodiment of a remote control wherein a card is being attached in a detachable manner to a remote control base.

In one embodiment, a base 32 (FIG. 2A), includes two channels 34 and 35 that face each other and a third channel 38 that is located transverse to each of channels 34 and 35. Therefore, in this embodiment, the three channels 34, 35, and 38 form a "U" shaped fastener 22 (FIG. 2A). Such a fastener 22 can be formed, for example as a single integral body by injection molding of high density polyethylene (HDPE) plastic material.

Base 32 also includes a button 12 (FIG. 1) in the form of, for example, a touch panel 12 (FIG. 2A) that is located centrally between channels 34 and 35. For convenience, the same reference numeral 12 is used in FIGS. 1 and 2A to identify the conceptual "button" and the physical "touch panel" in the respective drawings. Base 32 further includes a remote control circuit (not shown in FIG. 2A) and a signal transmitter, such as an infrared light emitting diode 37, that is coupled to the remote control circuit, and that is used to transmit to the host device a signal generated by the remote control circuit.

In this embodiment, channels 34, 35 and 38 each have a "U" shaped cross-section. Channels 34 and 35 are separated each from the other by a distance Wb (e.g. 3 inches) that is approximately equal to or slightly greater than (e.g. by 5%) a width Wc of leaf 11. Moreover, each of channels 34 and 35 has a clearance (between the two parallel sides in the "U" shaped channel) of Tb (e.g. 1 mm) that is approximately equal to or greater than (e.g. by 100%) the thickness of Tc of leaf 11. Therefore, leaf 11 easily slides between channels 34 and 35 in direction D. Such movement of leaf 11 is stopped by channel 38 (also called "stop member").

Each of channels 34 and 35 has a length Lb (e.g. 8 inches) that is smaller than a length Lc of leaf 11, so that at the end of assembling remote control 10, leaf 11 has a portion lip of length Le (FIG. 2B) that extends outside of base 32, wherein Le=Lc−Lb (e.g. 0.5 inch). Portion 11P allows leaf 11 to be easily grasped by a user for removal of leaf 11 from base 32, e.g. prior to insertion of another leaf 11 in order to reuse base 32.

During the assembly of remote control 10, an identity reader 23 that is included in base 32 is triggered by the movement of leaf 11, for example, by a switch (similar or identical to switch 202 described in U.S. patent application Ser. No. 08/824,103 incorporated by reference above). When triggered, identity reader 23 reads a pattern 113 that is formed e.g. of black bars (or holes) as illustrated in chance cards 208A–208R in U.S. patent application Ser. No. 08/916,780 incorporated by reference above. In this embodiment, pattern 113 is located at an edge 11E of leaf 11, and is sensed by reader 23 during the sliding of edge 11E in channel 35.

Identity reader 23 includes a light sensor array of the type described in U.S. Pat. No. 4,884,974 (see, for example, FIGS. 6 and 7, and column 7, lines 3–13) that is incorporated by reference herein in its entirety. The light sensor array is located in channel 35 preferably but not necessarily at base 32's open end (opposite to stop member 38) thereby to ensure that pattern 113 of any length can be read. The sensing of pattern 113 during the detachable attachment of leaf 11 to base 32 eliminates the need for a sliding mechanism otherwise required in the prior art to be swiped across pattern 113.

Remote control 10 thereafter transmits to host device 120 in signal 111 (FIG. 3B) an identification code (also called simply "code") that is determined from pattern 113. For example, remote control 10 (FIG. 2B) operates a light emitting diode 37, thereby to identify to host device 120 the identity of leaf 11 currently mounted in remote control 10. Signal 111 in this embodiment is an infrared signal in conformance with the format "TVIQ" of the protocol "TVIR" as described in microfiche Appendix B. Instead of TVIR, other protocols can be used, e.g. a protocol described in the IrDA specification available from IrDA e.g. via Internet at www.irda.org.

Figure 2B:
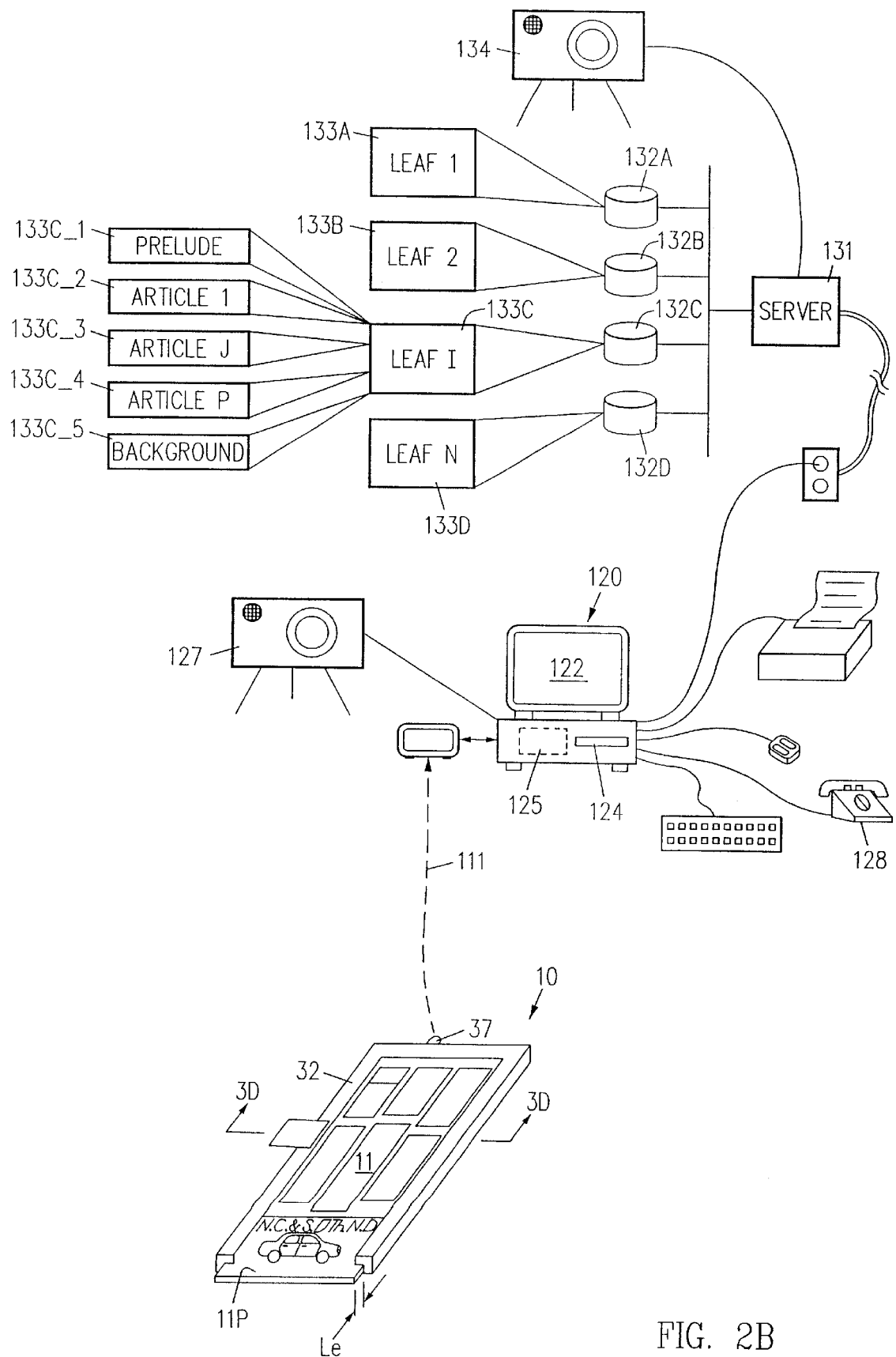
FIGS. 2B and 2C illustrate, in block diagrams, a system showing the control of information displayed by a host device by a wireless embodiment and a cable-based embodiment of a remote control of this invention.
Figure 2C:
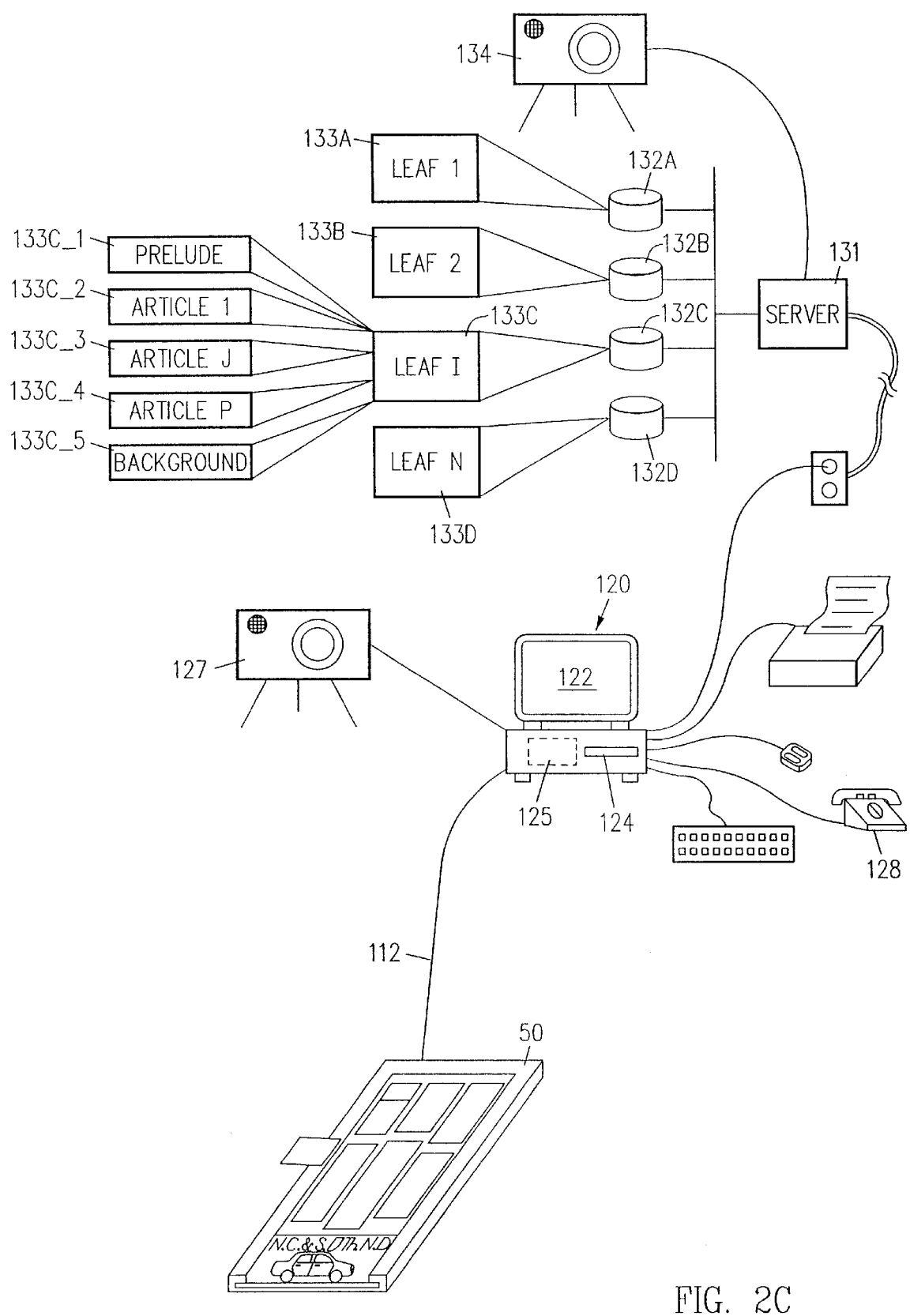

Moreover, instead of an infrared signal 111, an electrical signal can be transmitted through a cable 112 by a remote control 50 (FIG. 2C). In such an embodiment, cable 112 can be an RS-232 cable that is connected to a serial port of host device 120. Instead of RS-232, the protocol Universal Serial Bus (USB) can be used for signals on cable 112.

Protocol USB is described in, e.g. "Universal Serial Bus to Simplify PC I/O" by Michael Slater in Microprocessor Report, Volume 9, Number 5, pages 1 and 6–9, that is incorporated by reference herein in its entirety.

In another embodiment, the protocol "TVIR" as described in microfiche Appendix B is modified as follows. The carrier frequency is changed from 40 kilohertz to 38 kilohertz, by changing a constant "PulseNum" in microfiche Appendix A. Moreover, the number of bits in a check sum is changed from two bits to four bits, by changing the constant "PARITY" also in microfiche Appendix A.

Depending on the implementation, host device 120 can acknowledge to the user the receipt of an identification code that is transmitted e.g. during or immediately after insertion of leaf 11 into base 32 (FIG. 2A) by displaying, for example, a message (hereinafter "prelude message") 133C_1 (FIG. 2B) that contains the text "PLEASE TOUCH AN AREA." Host device 120 can also display other information, such as a commercial (in addition to prelude message 133C_1) as described in U.S. patent application Ser. No. 08/715,809 referenced above.

After assembly of remote control 10, when the user touches leaf 11, e.g. touches the content of an article, e.g. photograph P1 (FIG. 3A), pressure from the touch transfers through leaf 11 to touch panel 12, (FIG. 2A), and remote control 10 (FIG. 2B) operates LED 37 again, this time to transmit another signal 111 (FIG. 3B) that indicates the coordinates of the touched location. The coordinates identify an area (also called "touch sensitive area") A1 of leaf 11 that is associated with electronic content 133C_2.

Host device 120 uses the identification code and the coordinates (e.g. x1, y1) of the touched location to look up a table to identify, retrieve (if necessary through the Internet) and display electronic content 133C_2. Instead of electronic content 133C_2, host device 120 can display any of other electronic contents 133A–133D depending on which one of identity codes 1-N is sensed from leaf 11 that is inserted in base 32.

In an alternative embodiment, remote control 10 does not transmit two separate signals 111, one for the identification code and another for the coordinates of the touched location. Instead, remote control 10 transmits the identification code as well as the touched location's coordinates in a single signal 111 (as described below).

Figure 3A:
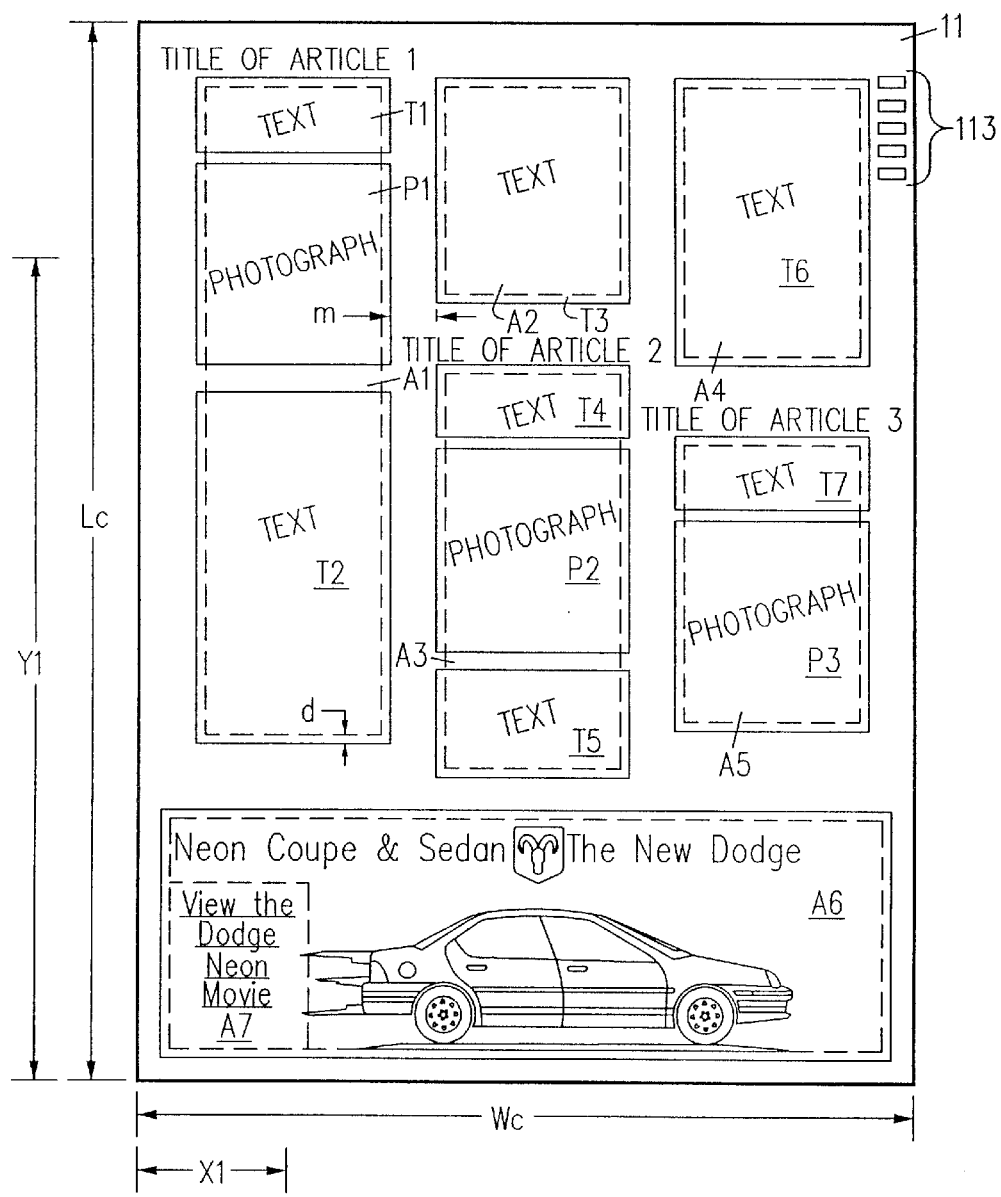
FIG. 3A illustrates, in a plan view, one example of the card of FIG. 2A having touch-sensitive areas for three articles and an advertisement when mounted in the remote control base of FIG. 2A.

In the example illustrated in FIG. 3A, other printed content in article 1, e.g. text T1 and text T2 also lie over area A1, and therefore touching text T1 or text T2 also causes the same electronic content 133C_2 to be displayed by host device 120. In this example, area A2 that underlies text T3 of article 1 is also associated with electronic content 133C_2. The association of areas A1 and A2 to electronic content 133C_2 (FIG. 2B) is provided in a table that is associated with leaf 11 and that is identified by an identification code encode in pattern 113 (FIG. 2A).

Each of touch sensitive areas A1–A6 (FIG. 3A) is preferably made smaller than the overlaid content by a distance d (FIG. 3A) around the boundary of the content, thereby to ensure that even if a printed content is misaligned by distance d (e.g. 2 mm), the appropriate electronic content 13 (FIG. 1) is still displayed. Moreover, the margin m (e.g. 10 mm) between adjacent printed contents is larger than distance d, thereby to ensure that even when a printed content is misaligned by distance d, the electronic content associated with an adjacent printed content is not inadvertently displayed.

Figure 3B:
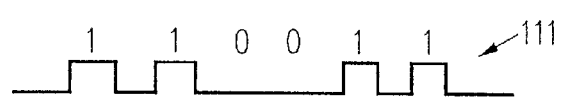
FIG. 3B illustrates, in a waveform, data generated by the remote controls of FIGS. 2B and 2C.
Figure 3C:
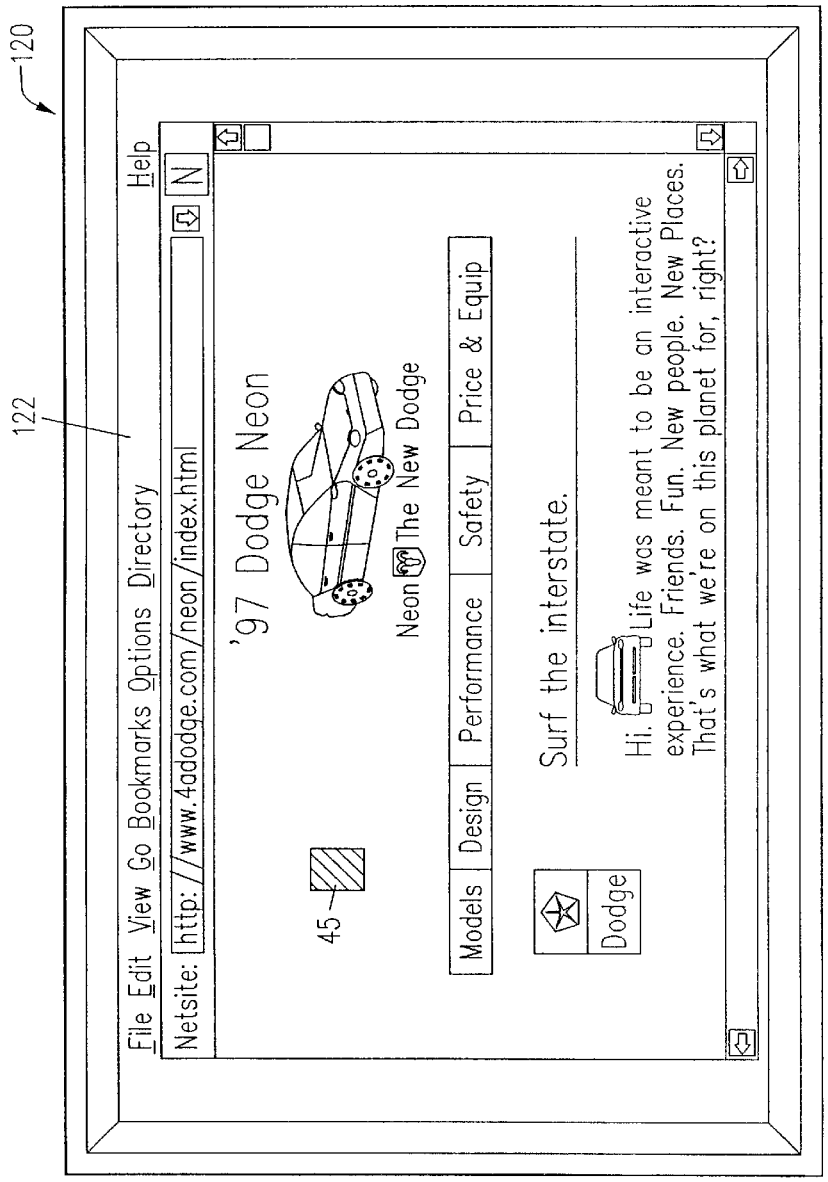
FIG. 3C illustrates the display of information by the host device of FIG. 2B in response to receipt of the signal of FIG. 3B.

Therefore, remote control 10 (FIG. 2B) provides a simple "touch and view" interface to the display of information by host device 120. For example, the user merely touches the car in area A6 (FIG. 3A) to view electronic content (also called "Web page") at Internet address www.4adodge.com/neon/index.html, that is displayed visually by host device 120 on monitor 122 (FIG. 3C).

In one embodiment, a publisher of a weekly magazine uses a different number in the identity code (also called "identification code") for each week's leaf 11, thereby to identify e.g. the current week's electronic content 13 (FIG. 1) for use with the current week's leaf 11. Moreover, the publisher makes a Web page available on a server 131 (see FIG. 2B) that is accessible over the Internet. The publisher makes the Web page available on the publication date of a magazine that includes leaf 11, so that a user can use leaf 11 (FIG. 2A) to view the publisher's Web page on the user's host device 120 (FIG. 2B).

In this embodiment, the user replaces a leaf 11 (FIG. 2A) in remote control 10 once a week, e.g. substitutes the leaf 11 torn from a TIME™ magazine published last week with another leaf 11 torn from the TIME™ magazine published in the current week, and views news clips and other information on currently advertised products identified in leaf 11's content (that is updated weekly by the TIME™ magazine publisher).

The use of different identification codes for each week's leaf 11 allows the user to access a prior week's electronic content 13 (FIG. 1) by using a prior week's leaf 11. Moreover, such use of different identification codes requires a user to have the current week's leaf 11 to access the current week's content 13, thereby requiring the user to renew subscription to the magazine.

In an alternative embodiment, a publisher manufactures a number of storage media (such as optical discs; not shown) containing the to-be-displayed information, one for each copy of the magazine (not shown). Thereafter, the publisher inserts each storage media in a holder (not shown) attached to a magazine that contains leaf 11. A user removes the storage media from the holder and inserts the storage media into a peripheral device 124 (FIG. 2B) of host device 120 prior to operating remote control 10. In response to the signal 111 from remote control 10, host device 120 retrieves to-be-displayed information from the inserted storage media in peripheral device 124, and displays the retrieved information.

In one implementation, such a leaf 11 does not have the predetermined pattern to provide an identification code to host device 120. Instead, it is assumed that peripheral device 124 holds a storage media that was initially packaged with leaf 11, e.g. in the current week's magazine TIME™. The storage media (e.g. a CD-ROM) has printed content that identifies (e.g. by date) the leaf 11 to be used in remote control 10. Therefore in this implementation, signal 111 does not carry an identification code to identify leaf 11. Host device 120 automatically uses a table in a storage media currently in device 124 to retrieve and display information related to the location indicated by signal 111.

In an alternative embodiment, base 32 does not have identity reader 23 (FIG. 2A). Instead, base 32 holds, in a nonvolatile memory (not shown in FIG. 2A) included in the remote control circuit, a predetermined identification code that indicates (either directly or indirectly) the location (e.g. an Internet address) of electronic content 13 (FIG. 1) to be displayed. The remote control circuit encodes the predetermined identification code in signal 111 (e.g. during the sliding of a card into the base), and host device 120 (FIG. 2B) accesses the most current electronic content 13 (FIG. 1) at the indicated location. In this embodiment, the user needs to use the current magazine's leaf 11 each week to ensure that the displayed information 13 is related to the specific content carried by leaf 11.

As noted above, the to-be-displayed information can be live content made available through a network, such as a satellite network, a cable network, or a telephone network by a publisher (e.g. publisher of TIME magazine). In such a case, the publisher prints specific content on leaf 11, e.g. a title of a concert to be performed, and a user views live content by simply attaching leaf 11 to the base and thereafter touching the title on leaf 11 e.g. during the live broadcast of the concert.

In one particular implementation, base 32 (FIG. 3D) includes a number of integrated circuit die 39A . . . 39I . . . 39R (where $A \leq I \leq R$, and R is the number of such dies) that are mounted on a side 12H of touch panel 12. Touch panel 12 also supports LED 37 and identity reader 23 (that can be, for example, a bar code scanner of the type described in U.S. patent application Ser. No. 08/916,780 incorporated by reference above). Touch panel 12 is attached to a side of channel 34 by an adhesive 40. Base 32 also includes a plate 41 that is attached by adhesive 40 to side 12H of panel 12, between channels 34 and 35, thereby to protect dies 39A–39R.

In this implementation, base 32 (FIG. 2A) also includes a pointing device, specifically a touch pad 42 that can be used to control the movement and location of a cursor 45 (FIG. 3C) on monitor 122, thereby to allow the user to navigate the display of information 13 in the normal manner (e.g. as in the Web browser Internet Explorer available from Microsoft Corporation). Pad 42 can be, e.g. Versa Pad™ available from Interlink Electronics, 546 Flynn Road, Camarillo, Calif. 93012.

Such integration of a pointing device and a remote control into a single device eliminates the need for, e.g. two separate housings, and two separate power supplies, and therefore provides cost savings over the prior art. The integration also eliminates the need for a user to keep track of and use two separate devices (e.g. a mouse and a remote control) otherwise necessary in the prior art.

Figure 4A:
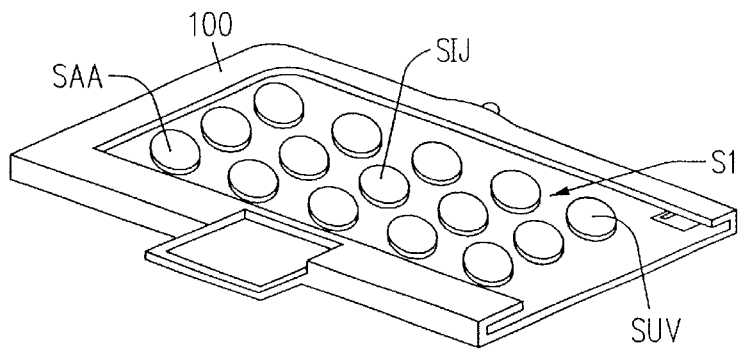
FIG. 4A illustrates, in a perspective view, a remote control that includes a two dimensional array of discrete switches.
Figure 4B:
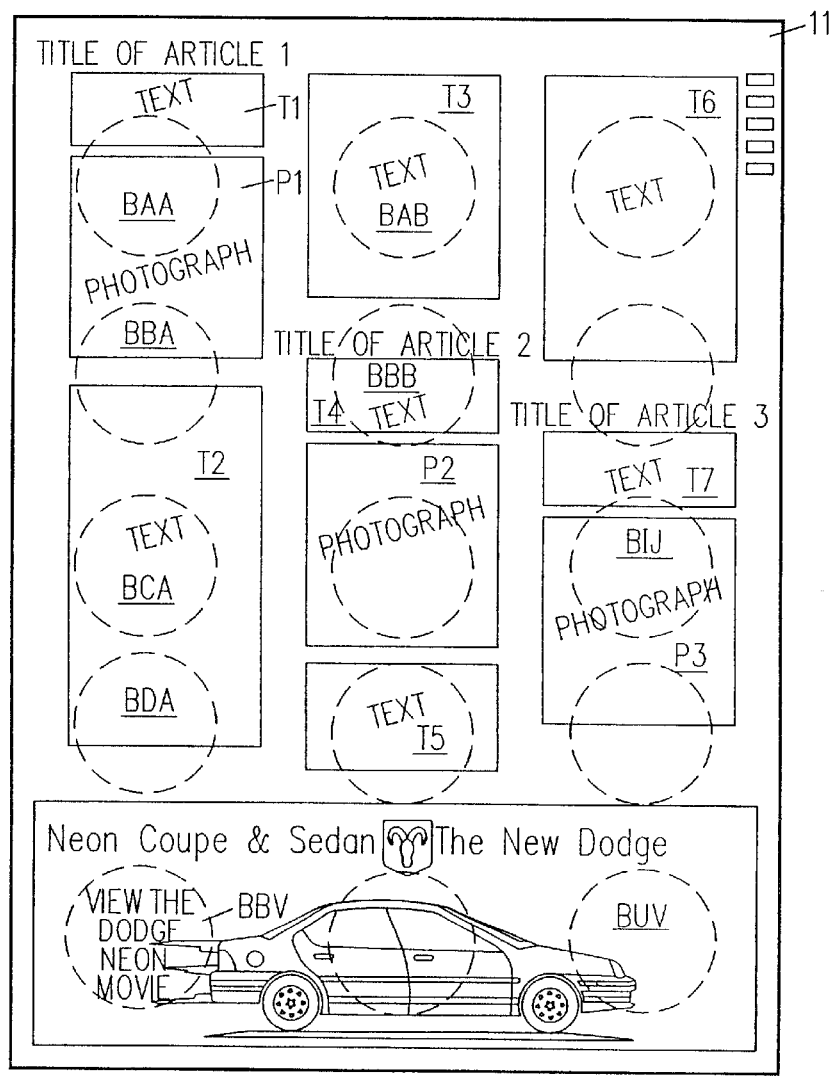
FIG. 4B illustrates, in a plan view, one example of the card of FIG. 2A having touch-sensitive areas for three articles and an advertisement when mounted in the remote control base of FIG. 4A.

Numerous variations and modifications of remote control 10 will be obvious to a person of skill in the art of remote controls in view of the disclosure. For example, instead of having a touch panel 12, in another embodiment, button 12 (FIG. 1) includes a switch in a two dimensional array S1 (FIG. 4A) of discrete switches SAA-SUV that are used to determine a location on leaf 11 (FIG. 4B) by base 100 (FIG. 4A).

Therefore, when a user touches, for example, a photograph P2 (FIG. 4B), an underlying switch SIJ (FIG. 4A) closes an electrical path in the remote control circuit as described below in reference to FIG. 11. Therefore, in this particular embodiment, leaf 11 has a number of touch sensitive areas (shown dotted in FIG. 4B) BAA, . . . BIJ, . . . BUV, where $A \leq I \leq U$ and $A \leq J \leq V$, U and V being the number of columns and rows respectively in two dimensional array S1.

When a user touches, for example, text T1 in touch sensitive area BAA, an underlying discrete switch SAA (FIG. 4A) is closed, thereby to cause the transmission of an appropriate signal 111 (FIG. 3B) containing, e.g. predetermined Cartesian coordinates of switch SAA. The Cartesian coordinates for each switch SIJ are stored in a table encoded in a memory 1103M (FIG. 11) included in microcontroller 1103.

Figure 11:
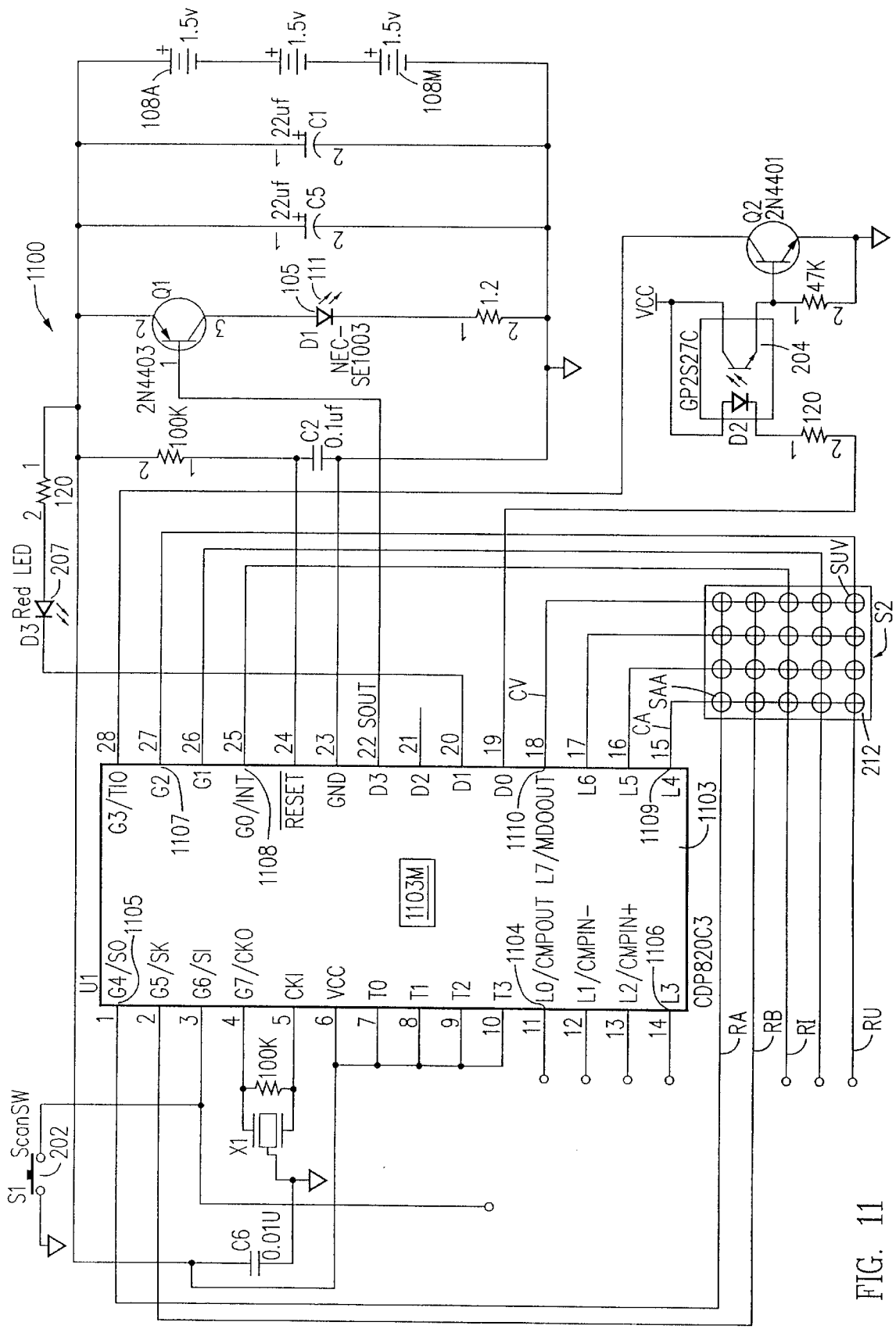
FIG. 11 illustrates, in a schematic circuit diagram, a remote control circuit included in the remote control of FIG. 4A.

Alternatively, microcontroller 1103 can transmit a predetermined identifier for a closed switch SIJ, e.g. a row number I for row RI and a column number J for column CJ (FIG. 11). In another variant of the embodiment, instead of transmitting the row and column numbers, microcontroller 1103 transmits a predetermined switch code, e.g. a number 1 for switch SAA, a number 2 for switch SAB, and a number IJ for switch SIJ and host device 120 (FIG. 3A) uses number IJ in an appropriate table to identify an area BIJ (FIG. 4B) touched by the user.

In this embodiment, a publisher of leaf 11 ensures that the printed content, e.g. text T1, photograph P1, text T2 and text T3 are aligned to and located over touch sensitive areas BAA, BBA, BCA, BDA and BAB (FIG. 2F). Various touch sensitive areas that are not clearly covered by a single article, (e.g. touch sensitive area BBB is covered only partially by text T4) are unassociated with any electronic content 13 (FIG. 1), and are inactive. Therefore, when a user touches touch sensitive area BBB, host device 120 (FIG. 3A) does not display on monitor 122 any information related to the printed content of articles 1 and 2. Host device 120 can optionally display an error message requesting the user to touch another touch sensitive area BIJ, e.g. the message "PLEASE TOUCH ANOTHER AREA IN THE SELECTED ARTICLE".

In some of the embodiments discussed above, remote control 10 (FIG. 1) transmits, in wireless signal 111 (FIG. 3B) an identification code that identifies to host device 120, the information to be displayed on monitor 122. In one implementation, the identification code includes an Internet address in the form of a Uniform Resource Locator (URL) code, and host device 120 uses the URL code directly (via browser software such as NETSCAPE's Navigator) to retrieve electronic content 13 (FIG. 1).

In an alternative implementation, the identification code includes a product code, such as the Universal Product Code (UPC) normally printed as a pattern on the cover of a magazine and used in determining the price at a checkout stand of a store. In the alternative implementation, host device 120 uses the identification code indirectly, e.g. performs a table lookup to find the URL code or other address of electronic content 13. Such a table can be stored either locally on a storage media (e.g. hard disk) permanently installed within host device 120 or on a removable storage media, such as an optical disk removably mounted in a storage media drive 124 of host device 120 (FIG. 2B), or on a remote storage media accessible from server 131 e.g. via Internet.

Figure 5G:
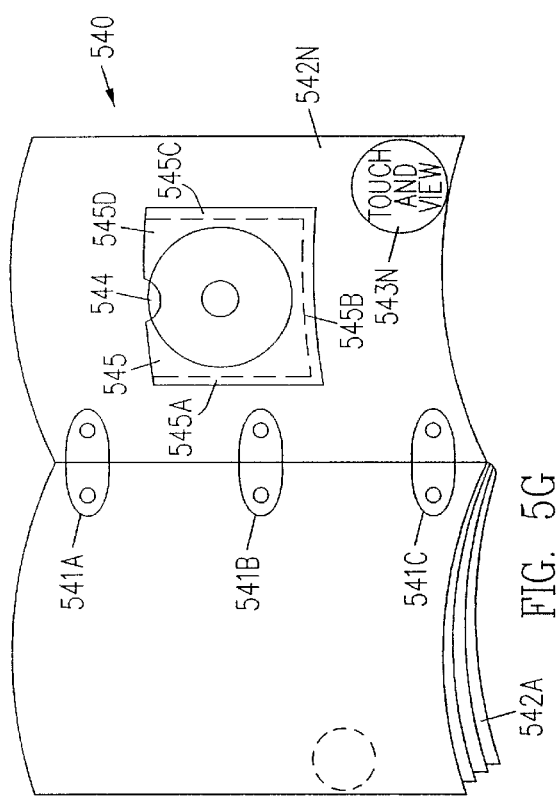
FIGS. 5F and 5G illustrate, in perspective views, an insert in the form of a booklet in closed and open positions respectively.

In one variant of the alternative implementation, an optical disc (such as CD-ROM 544 illustrated in FIG. 5G) is provided by the publisher of a periodical in a holder that is physically attached to the periodical. The user removes the optical disc from the holder and inserts the optical disc into storage media drive 124 in host device 120. On insertion of an optical disc or other such storage media, host device 120 can automatically suspend the display of any current displayed information and automatically start execution of software retrieved from the storage media as described in U.S. patent application Ser. No. 08/497,177 incorporated by reference above. Thereafter, when the user assembles and operates remote control 10 (as described herein), host device 120 retrieves from the inserted storage media one or more tables required to identify the selected information and thereafter displays the selected information in response to wireless signal 111, as described in, for example, U.S. patent applications Ser. Nos. 08/269,492 and 08/816,616 incorporated by reference above.

In another variant of the alternative implementation, host device 120 uses a UPC code directly to display on monitor 122 electronic content 13. Specifically, remote control 10 transmits in wireless signal 111, as the identification code, a UPC code, e.g. the number 3224502192 that indicates the book "The Cruise Caper" by Marilyn L. Bollinger, available from Hasboro, Inc., Pawtucket, R.I. 02862. On receipt of the UPC code, host device 120 looks up on server 131 (FIG. 2B) the file 3224502192.HTML. Server 131 is coupled to a storage media, e.g. one of disks 132A–132D on which are stored a number of files each having a UPC code as the file name in a home directory of server 131. Each of the files (not shown in FIG. 2B) includes a HTML instruction to redirect the host device 120 to the address of the requested electronic content.

For example, if associated electronic content 13 for "The Cruise Caper" is available at the Internet address www.cruise.com/movie2.html, the file 3224502192.HTML in server 131's home directory contains the following software instructions that redirect host device 120 to the publisher's server:

<html><meta http-equiv="refresh"
content="0;www.cruise.com/movie2.html"></html>

To a user, electronic content 13 (e.g. movie2.html) is displayed on monitor 122 after host device 120 looks up the file 3224502192.HTML on server 131 and thereafter retrieves electronic content 13 from the publisher's server at the redirected Internet address. In this example, the Web page in the file movie2.html presents a movie and/or displays other information as determined by the publisher of "The Cruise Caper." As is well known to the skilled artisan, the file movie2.html can be updated periodically, e.g. once a week to display a different movie, thereby to attract a user, such as a five year old child, into using the remote control at least once a week.

In another embodiment, host device 120 retrieves electronic content 13 from a video camera 134 (FIG. 2B), such as model no. VLH450U by Sharp Corporation, available from Fry's Electronics, Campbell Calif. In one example, host device 120 displays an on-going sports event, such as the Super Bowl, for example if the user touches printed content describing a to-be-played Super Bowl game in a sheet describing the game and enclosed e.g. in Sports Illustrated magazine.

In another example, leaf 11 (FIG. 2B) is a business card of a real estate agent, and touching an area of the business card causes host device 120 to automatically determine and dial a telephone number of the identified real estate agent, and thereafter to allow the user to converse with the real estate agent, e.g. via a voicelink established through a telephone instrument. As an option, host device 120 uses a video camera 127 (if included as a part of host device 120) to establish a video link with the identified real estate agent thereby to allow a display of homes of interest to the user.

In an alternative embodiment, host device 120 retrieves electronic content 13 (FIG. 1) from a local storage media, e.g. the above-described optical disc through storage media drive 124. Specifically, host device 120 compares an identification code retrieved from wireless signal 111 with another identification code retrieved from the optical disc to ensure that electronic content 13 associated with the touched printed content is available on the optical disc. On finding a match, host device 120 displays electronic content 13 that is retrieved from the optical disc. If host device 120 cannot find an identification code from wireless signal 111 in the optical disc, host device 120 displays an error message requesting the user to insert the appropriate disc.

In yet another embodiment, host device 120 retrieves electronic content 13 from a hard disk 125 (FIG. 2B) in a manner similar to that described above for the optical disk. Specifically, host device 120 compares an identification code retrieved from wireless signal 111 with another identification code retrieved from hard disk 125, to ensure that electronic content 13 is available on hard disk 125. On finding a match, host device 120 displays electronic content 13 that is retrieved from hard disk 125. Electronic content 13 can be stored on hard disk 125, for example by use of software (commonly called "push" software) that retrieves electronic content 13 through Internet periodically and stores the electronic content on hard disk 125. Push software such as POINTCAST is available from, for example, Pointcast Inc., 10101 North De Anza Blvd., Cupertino, Calif. 95014.

In still another embodiment, host device 120 does not compare two identification codes as described above. Instead, it is assumed that a drive 124 contains an appropriate storage media (e.g. a CD-ROM that was initially supported by leaf 11) and host device 120 displays information (e.g. the first file) from that storage media (e.g. in response to the touching of a first region of leaf 11).

Remote control base 32 can include a light emitting diode (abbreviated as "LED"; not shown in FIG. 1) that is operated to momentarily emit, for example, green light, through a window in one of channels 34 and 35, thereby to indicate that the remote control 10 is properly assembled and available for use. If identity reader 23 encounters an error during the sensing of bar code pattern 113, remote control base 32 does not activate the light emitting diode, thereby to indicate to a user the need to remove and reinsert leaf 11. In an alternative embodiment, identity reader 23 activates the LED only on encountering an error during the reading of bar code pattern 113. In such an embodiment, the LED is operated to emit red light, thereby to indicate to the user the need to remove and reinsert leaf 11.

Figure 4C:
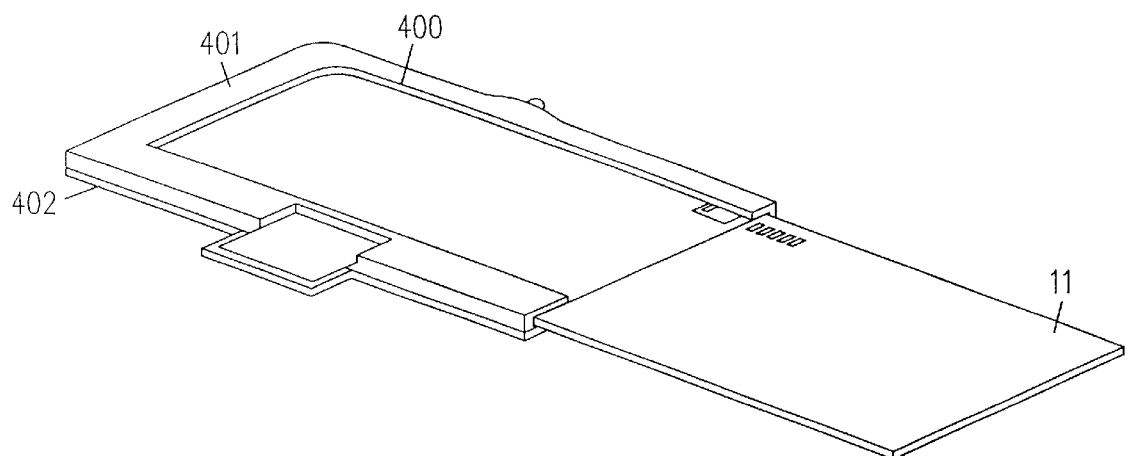
FIGS. 4C and 4D illustrate, in perspective views, in a closed position and an open position respectively, a remote control having a keyboard in accordance with the invention.
Figure 4D:
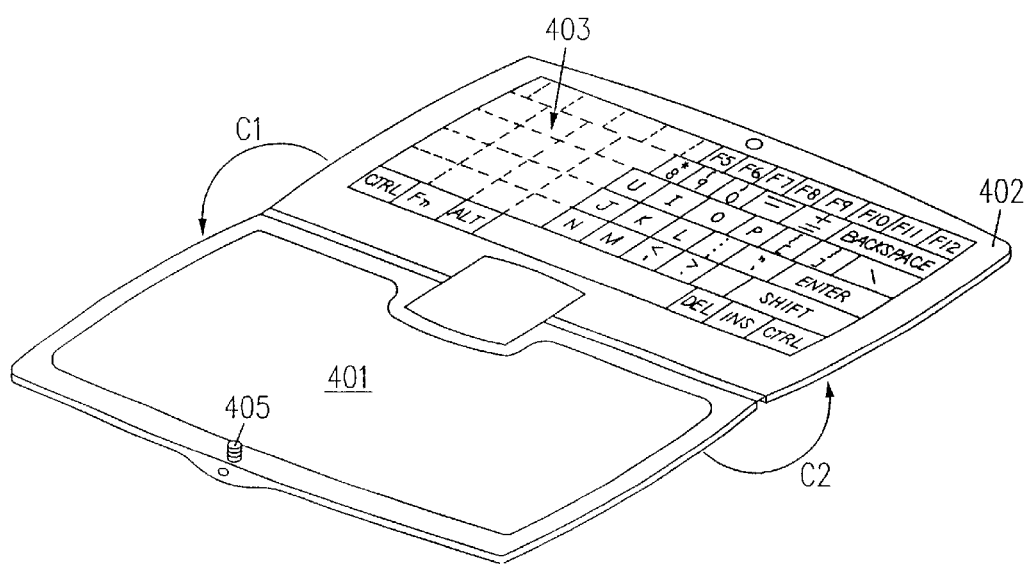

In another embodiment, a base 400 has an upper portion 401 (FIG. 4C) similar to above-described base 32, and a lower portion 402 that includes a keyboard 403. To access keyboard 403, the user flips open the two portions 401 and 402, e.g. by moving portion 401 in the direction C1, away from portion 402. Such opening of base 400 operates a switch 405 that in turn activates keyboard 403. In this embodiment, the user can fold portion 401 over (to go under portion 402) in the direction C2 to obtain a compact structure that has only keyboard 403 exposed (leaf 11 being hidden between portions 401 and 402).

Thereafter, the user uses keyboard 403 in the normal manner to navigate the display of information 13 by host device 120. The integration of a keyboard 403 into base 400 further enhances the above-described advantages of integrating a pointing device and a remote control. Instead of pad 40, a joystick as described in U.S. patent application, Ser. No. 08/631,015 can be included in a remote control as described herein.

In still another embodiment, a remote control 500 (FIG. 5A) includes a base 510 in the form of a file folder, and an insert 520 in the form of a booklet having a number of leaves (e.g. 10 leaves). Base 510 includes a front cover 511, a back cover 512 and a spine 513 (FIG. 5B) that connects the two covers 511 and 512. Each of front cover 511 and back cover 512 includes a button, such as a touch panel (as described above in reference to base 32 in FIG. 2A) or a switch in an array of discrete switches included in the cover (as described above in reference to base 100 in FIG. 4A).

Base 510 also includes, mounted on spine 513, a fastener in the form of rail 514 that has a cross-section in the shape of the letter "C". Rail 514 has a longitudinal cavity 515 formed behind longitudinal edges 514A and 514B that each face the other. In this particular embodiment, base 510 includes an identity reader 516 that is mounted on a ceiling of cavity 515 i.e. inside rail 514.

Insert 520 (FIG. 5A) includes a leaf 521 to which is attached a booklet 522 having a number of leaves 522A–522N, wherein A≦I≦N (FIG. 5C). In one particular implementation, each of leaves 522A–522N and leaf 521 are formed of conventional paper (e.g. 120 gsm) and are attached together in the normal manner, e.g. by staples or an adhesive. Therefore insert 520 of this embodiment is manufactured by a conventional printing process. Leaf 521 includes a first portion 521P that is located between longitudinal edges 514A and 514B (FIG. 5B) when insert 520 is mounted on base 510 by sliding a second portion 521B (FIG. 5C) into cavity 515 (FIG. 5B) in the direction D (FIG. 5A). During the mounting, a bar code pattern 521I printed on second portion 521B is read by identity reader 516, thereby to determine a number that identifies insert 520. In another implementation, insert 520 does not have bar code pattern 521I, and channel 514 does not have reader 516. Instead, base 510 either operates under the assumption that the appropriate storage media containing the to-be-displayed information is packaged with insert 520 or that base 510 includes a memory pre-programmed with an identity code as described below.

In this particular embodiment, first portion 521P (FIG. 5C) has a thickness TP (e.g. 0.05 mm) that is smaller than the distance Tc (e.g. 1 mm) between edges 514A and 514B, while second portion 521B has a thickness Tf (e.g. 1.5 mm) that is larger than the distance Tc. Therefore, second portion 521B prevents the unintentional separation of leaf 521 from rail 514, e.g. when a user pulls on booklet 522. Therefore, second portion 521B acts as mating part 22 and rail 514 acts as mating part 21 (FIG. 1). Portion 521B (FIG. 5A) is formed in one embodiment by folding a part 521T and stapling or gluing part 521T to an underlying part 521L of portion 521B, thereby to form a male rail in portion 521B.

In a variant of the above-described embodiment, leaf 521 supports a booklet in a transverse manner so that the booklet's spine is perpendicular to channel 514 when assembled. Such a variant eliminates the need for front cover 511 to include a button because a touch panel in back cover 512 is sufficient to make all leaves of the booklet touch sensitive.

In an alternative embodiment, insert 520 consists essentially of leaf 521, and is devoid of booklet 522. Such a leaf 521 can have the size of, for example, a postcard. Also, in another embodiment, such a leaf is devoid of the above-described male rail and instead, a planar edge of the leaf is mounted in channel 514, and can be yanked out by pulling in lateral direction L. The planar edge has a thickness approximately equal to the distance Te (FIG. 5B) and fits within rail 514, thereby to act as mating part 22 (FIG. 1).

In the embodiment illustrated in FIGS. 5A and 5C, each of leaves 522A–522N has a corresponding mark (e.g. regions having predetermined content) 523A–523N in an area AR that is reserved for such marks. Each of marks 523A–523N on the respective leaves 522A–522N is provided at a location different from the location of every other mark 523–523N, so that touching a mark (also called "page mark") 523I immediately identifies two adjacent leaves 521A and 521I (FIG. 5C) that are currently laid open in remote control 500. In one variant of this embodiment, each of page marks 523A–523N (FIG. 5A), such as mark 523I (FIG. 5J) has identical printed content (e.g. "TOUCH AND VIEW®"). In other variants, instead of text, a graphic icon indicates the location to be touched to identify the leaves that are currently laid open.

When a user touches one of marks 523A–523N, pressure from the user's touch is transferred through the leaf, e.g. leaf 522I and through other intervening leaves, e.g. leaf 522N (FIG. 5C) and leaf 521 to back cover 512 (FIG. 5A). Back cover 512 includes a touch panel that responds to the pressure, to generate data indicating the location of the pressure (e.g. x,y coordinates) that are transmitted by an infrared LED 517 (FIG. 5A) thereby to cause the transmission of data via a remote control signal 111 (FIG. 3B).

In one embodiment, the user must touch a page mark 523I first, and thereafter touch one of areas (also called "regions") A1–A7 to indicate the associated electronic content 13 (FIG. 1) to be displayed. In an alternate embodiment, the user first touches one of areas A1–A7, and thereafter touches page mark 523I to indicate the electronic content 13 to be displayed. In the alternative embodiment, a user can change their mind about the information to be displayed, e.g. touch an area A1 and then touch an area A3 and then followed by touching of page mark 523I to cause the display of information related to area A3.

Therefore, the alternative embodiment is more intuitive because the user uses page mark 523I as a confirmation to indicate the most recent deselected information is to be displayed. Moreover, the requirement of touching printed content of a leaf 522I multiple times, e.g. two times in this embodiment, eliminates the possibility of an information displayed being started accidentally by someone just touching leaf 522I inadvertently.

Each of touch sensitive areas A1–A7 (FIG. 5G) is preferably made smaller than the overlaid printed content by a distance d (FIG. 5J) around the boundary of the printed content, thereby to ensure that even if the printed content is misaligned by distance d, the appropriate electronic content 13 (FIG. 1) is displayed. Moreover, the margin e.g. between adjacent printed contents is larger than distance d thereby to ensure that even when printed content is misaligned by distance d, the electronic content associated with an adjacent printed content is not inadvertently displayed.

Figure 5I:
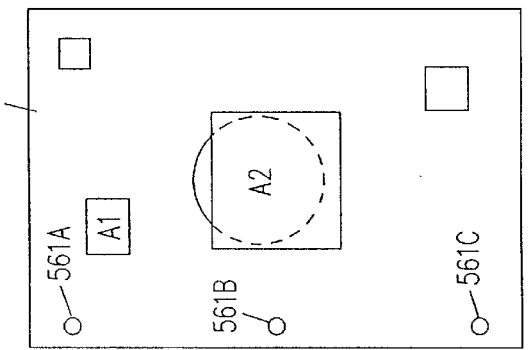
FIG. 5I illustrates, in a perspective view, an insert in the form of a single three-holed leaf that is mounted on the base of FIGS. 5D and 5E to form another remote control of the invention.
Figure 5F:
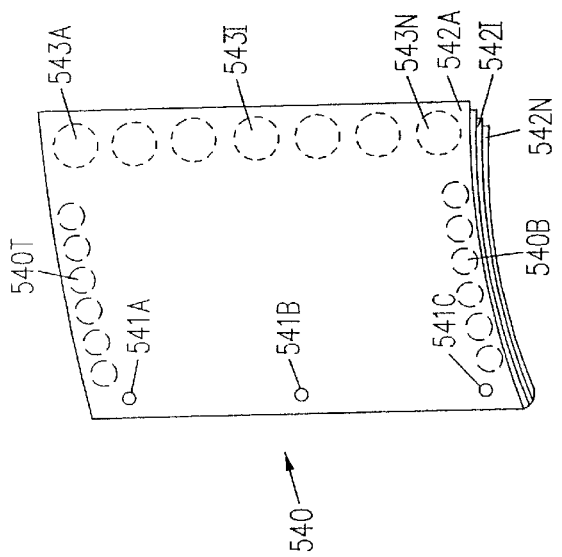
Figure 5H:
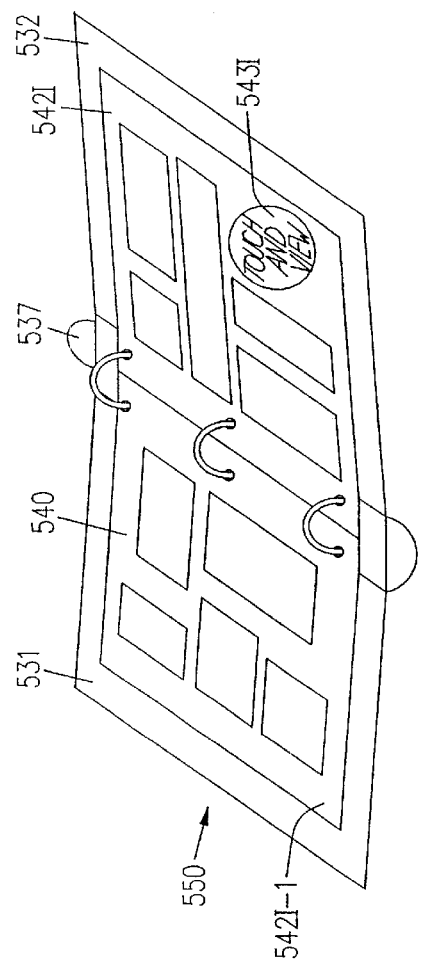
FIG. 5H illustrates, in a perspective view, the booklet of FIGS. 5F and 5G mounted in the base of FIGS. 5D and 5E to form a remote control of the invention.
Figure 5J:
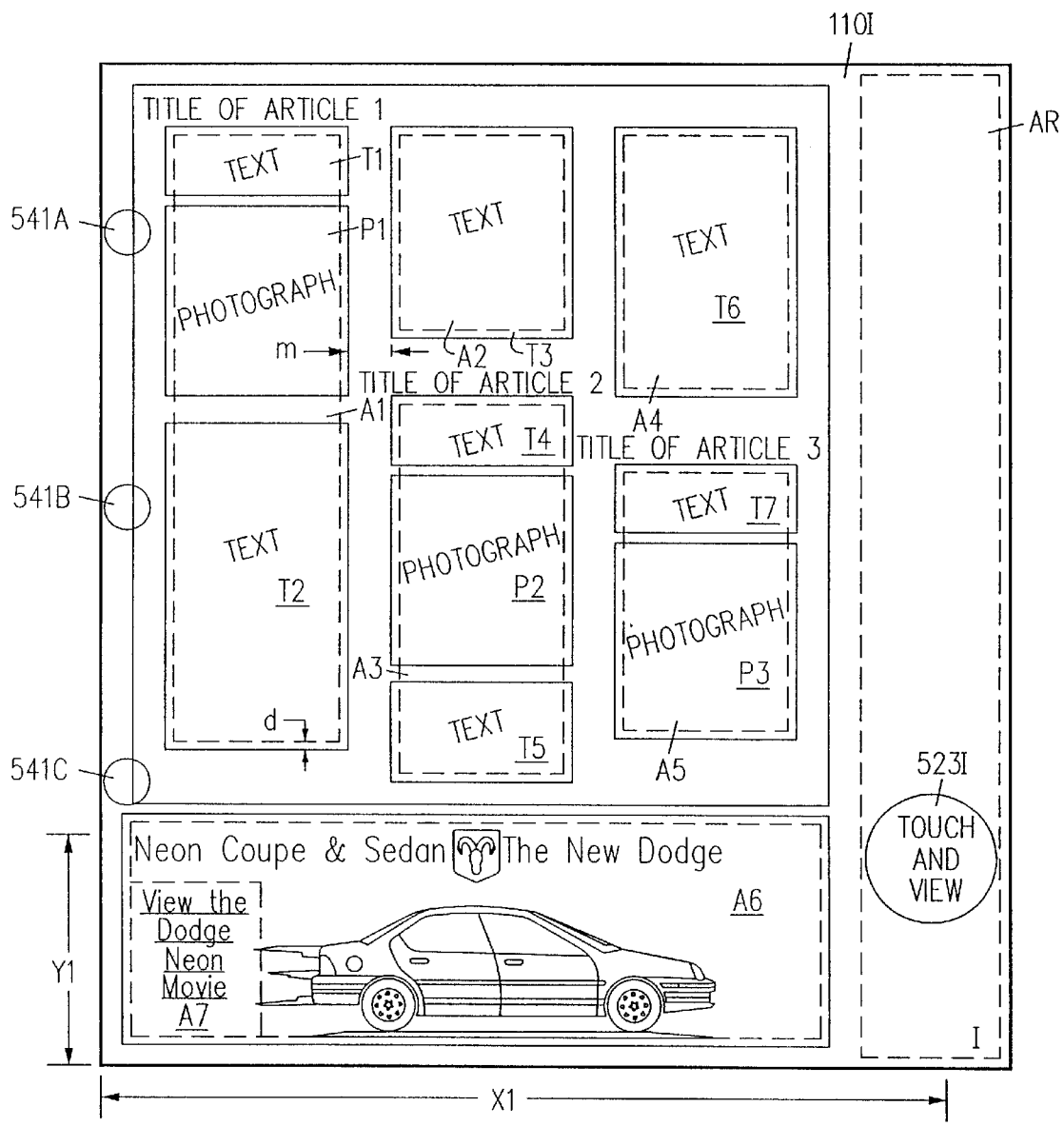
FIGS. 5J and 5K illustrate, in plan views, touch-sensitive areas of one leaf of a booklet when the booklet is mounted in a base having a touch panel or an array of switches respectively.
Figure 5K:
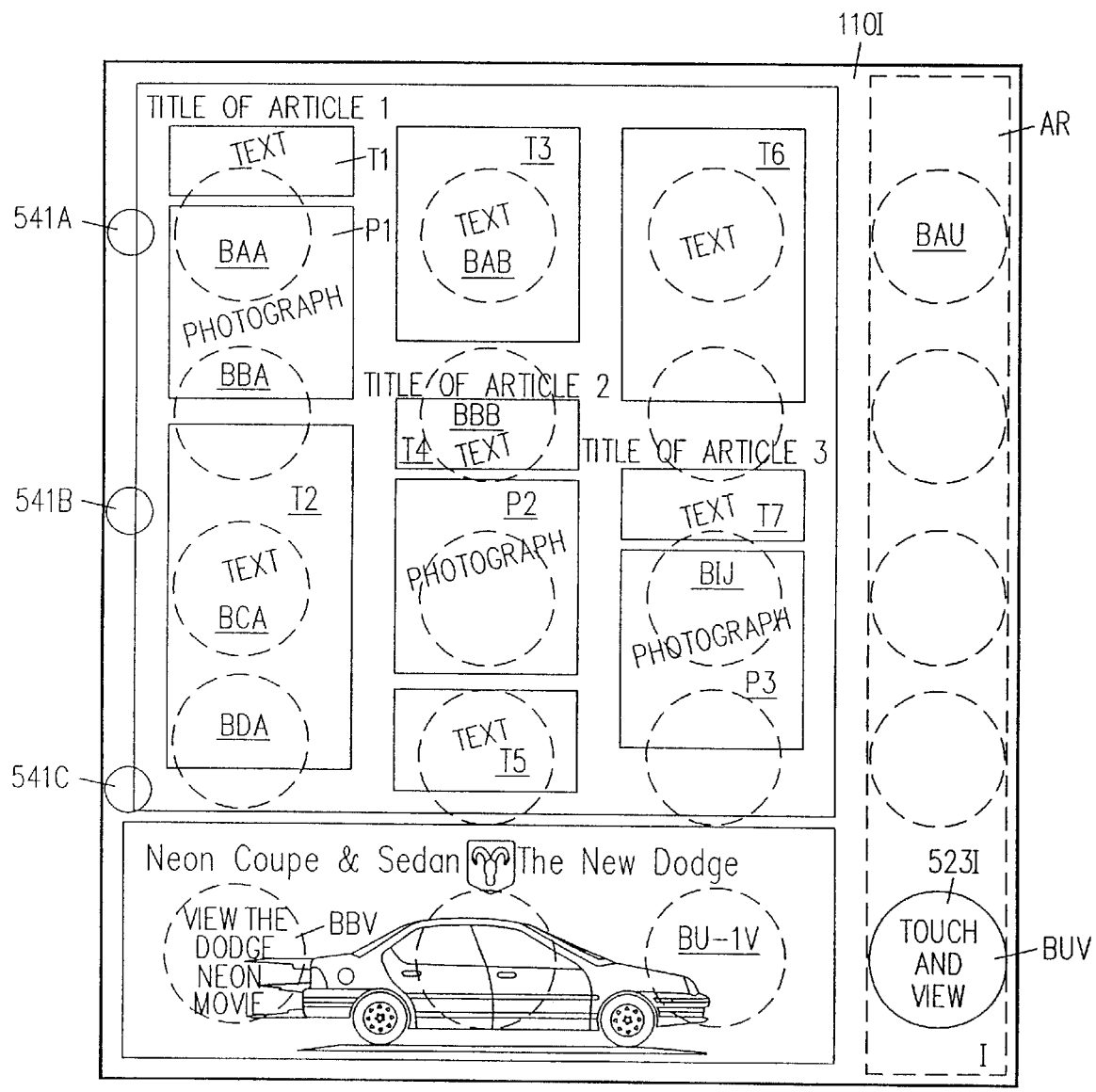

Instead of a touch panel, cover 512 can include an array of switches SAA-SUV (see FIG. 4A) and in such an embodiment, each page mark 523I lies over an underlying switch SIJ that is operated when the user touches page mark 523I (see FIG. 5K).

In still another embodiment, a remote control base 530 has the form of a file folder, and includes a front cover 531, a back cover 532 and a spine 533 (FIG. 5D) that connects covers 531 and 532. Each of covers 531 and 532 has an external surface that is planar thereby to give the appearance of a normal file folder. Base 530 also includes a fastener 534 having three rings 534A–534C, and therefore base 530 has the appearance of a normal 3-ring binder.

In one particular implementation, fastener 534 is a conventional three-ring binder mechanism (e.g. formed of steel), and rings 534A–534C are movable between closed and open positions, so that paper having corresponding holes can be retained on rings 534A–534C in the normal manner. One example of fastener 534 is described in U.S. Pat. No. 4,295,747 that is incorporated by reference herein in its entirety. Other types of file folders as described in, e.g. U.S. Pat. Nos. 4,552,478 and 4,214,839 can be used in other implementations of base 530.

A booklet 540 (FIG. 5F) having three holes 541A–541C at locations corresponding to the locations of rings 534A–534C is mounted in base 530 thereby to form remote control 550 (FIG. 5H). Therefore, in this particular embodiment, rings 534A–534C and holes 541A–541C function as mating parts 22 and 21 respectively (FIG. 1). Booklet 540 includes leaves 542A–542N, and each leaf 542I has a corresponding mark 543I used to identify adjacent leaves 542I-1 and 542I, as described below.

A single page mark 543I (FIG. 5H) is sufficient if leaves 541I-1 and 542I are held together in sequence (as in a booklet), because front cover 531 identifies a touched location on the back side of leaf 542I-1, and back cover 532 identifies a touched location on the front side of leaf 542I. However, if leaves 542I-1 and 542I are not held in sequence, i.e. leaves 542Ak–542N (FIG. 5F) are loose leaves that can be arranged in any order, then a page mark is required on each of the two sides of a leaf, to identify which of the two sides is currently laid open for inspection by the user.

In this particular embodiment, booklet 540 does not have a bar code or any other type of pre-determined pattern to indicate an identity to base 530. Moreover, base 530 does not have an identity reader (such as identity reader 516 described above in reference to FIG. 5B). Instead, booklet 540 has, supported by a leaf (e.g. last leaf 542N), a storage media, such as CD-ROM 544.

In one implementation, CD-ROM 544 is supported within a pouch 545 attached to leaf 542N. Pouch 545 is formed in one particular embodiment by film of acetate that is glued to leaf 542N on three sides 545A–545C, and fourth side 545D is left unglued to allow removal of CD-ROM 544. In this implementation, CD-ROM 544 has printed content (e.g. text) that uniquely identifies to the user the identity of booklet 540 to be used with CD-ROM 544. For example, each of CD-ROM 544 and booklet 540 may have the same title, such as "FRED, THE FIRE ENGINE", and the user coordinates the simultaneous use of CD-ROM 544 and booklet 540.

To use remote control 550 (FIG. 5H), the user must first mount CD-ROM 544 in a peripheral of host device 120 (FIG. 2B) and cause host device 120 to execute the software stored in CD-ROM 544. During execution of software, host device 120 interprets the signals transmitted by an infrared LED 537 included in base 530 (FIG. 5E). As noted above, such an LED 537 is operated to transmit a signal indicating the location of a region of booklet 540 touched by the user.

In an alternative embodiment, a booklet does not have a storage media, and instead has a mark (similar to mark 543I described above) that is located at a different position in each booklet in a set of booklets that can be used in remote control base 530. There can be, for example, twelve booklets, one for each month, with six positions for the marks at a top edge 540T and six additional positions at the bottom edge 540B (FIG. 5F). Each of the twelve booklets has only one mark (also called "booklet mark") in any of the twelve positions, thereby identifying a month in which the booklet was published.

In such an embodiment, remote control base 530 includes a memory (e.g. memory 1103M in FIG. 11) that is pre-programmed with an identity code. Such an identity code is transmitted to host device 120 along with the position of a booklet mark, thereby to identify the to-be-displayed information that is related to content printed in the booklet currently mounted in the remote control base. In one particular implementation, host device 120 translates the identity code into an Internet address at which the to-be-displayed information is available. Therefore, a user must first touch a booklet mark at top edge 540 or at bottom edge 540B to identify the currently mounted booklet. Thereafter the user uses the booklet in the above-described manner, e.g. touches one of page marks 543A–543N and an area e.g. area A1 (FIG. 5J) to pull up information related to article 1.

In one variant of card reader remote control 1D (FIG. 2A), Card 11 supports a booklet (not shown), thereby to make leaves in the booklet touch sensitive. In one implementation, such a booklet is mounted with the booklet's spine located next to channel 34, and therefore the booklet's leaves are touch sensitive only on one side (which is exposed when the leaf lies over button 12). In another implementation, such a booklet is mounted with the booklet's spine located perpendicular to channel 34, midway along the length Lb (FIG. 2A) so that leaves are touch sensitive on both sides of the spine.

Moreover, instead of a booklet 540, a single leaf 560 (FIG. 5I) having the appropriate three holes 561A–561C can be mounted in base 530 to form remote control 550. The two file-folder remote controls 500 and 550 are simple and easy to use because a booklet in the remote controls can be opened in the normal manner of a book, e.g. by moving front cover 511 away from a back cover 512. Thereafter, the user can read in the normal manner, and when necessary touch an area AI (FIG. 5J) followed by touching page mark 523I to cause the display of information related to article I. Moreover, the user can flip one or more leaves 522I–522J back and forth in the normal manner of a book, thereby the providing the user with a level of comfort not otherwise possible in remote controls of the prior art.

Figure 5N:
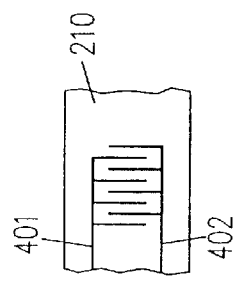
FIG. 5N illustrates, in an enlarged plan view of the area 5N (FIG. 5L) of the printed circuit board included in the base of FIG. 5D.
Figure 5O:
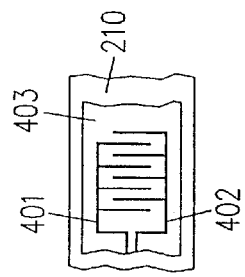
FIG. 5O illustrates, in an enlarged plan view of the area 5N (FIG. 5L), an alternative embodiment of the printed circuit board using a flexible tape.
Figure 5L:
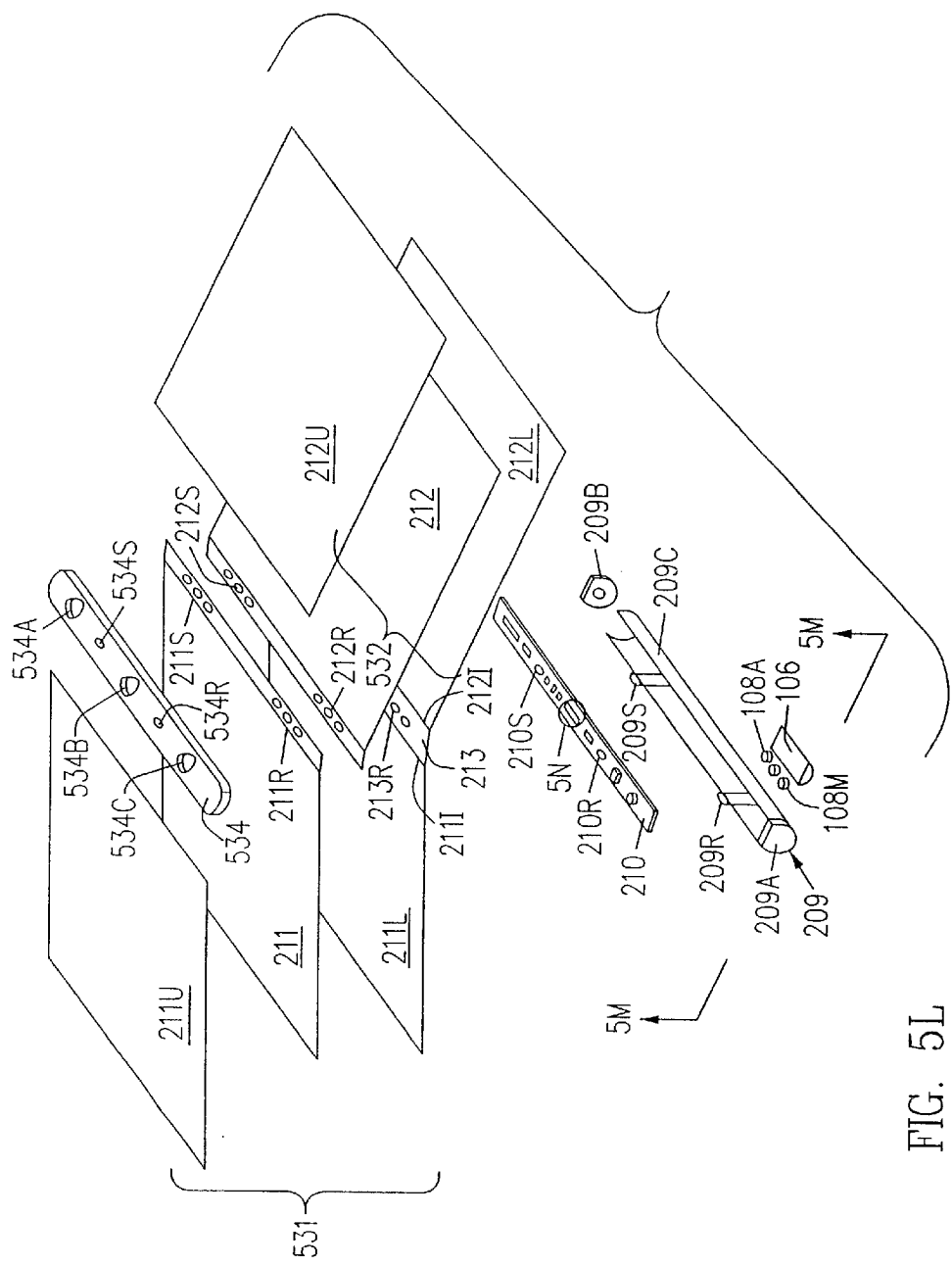
FIGS. 5L and 5M illustrate, in exploded views, the base of FIG. 5D.
Figure 5M:
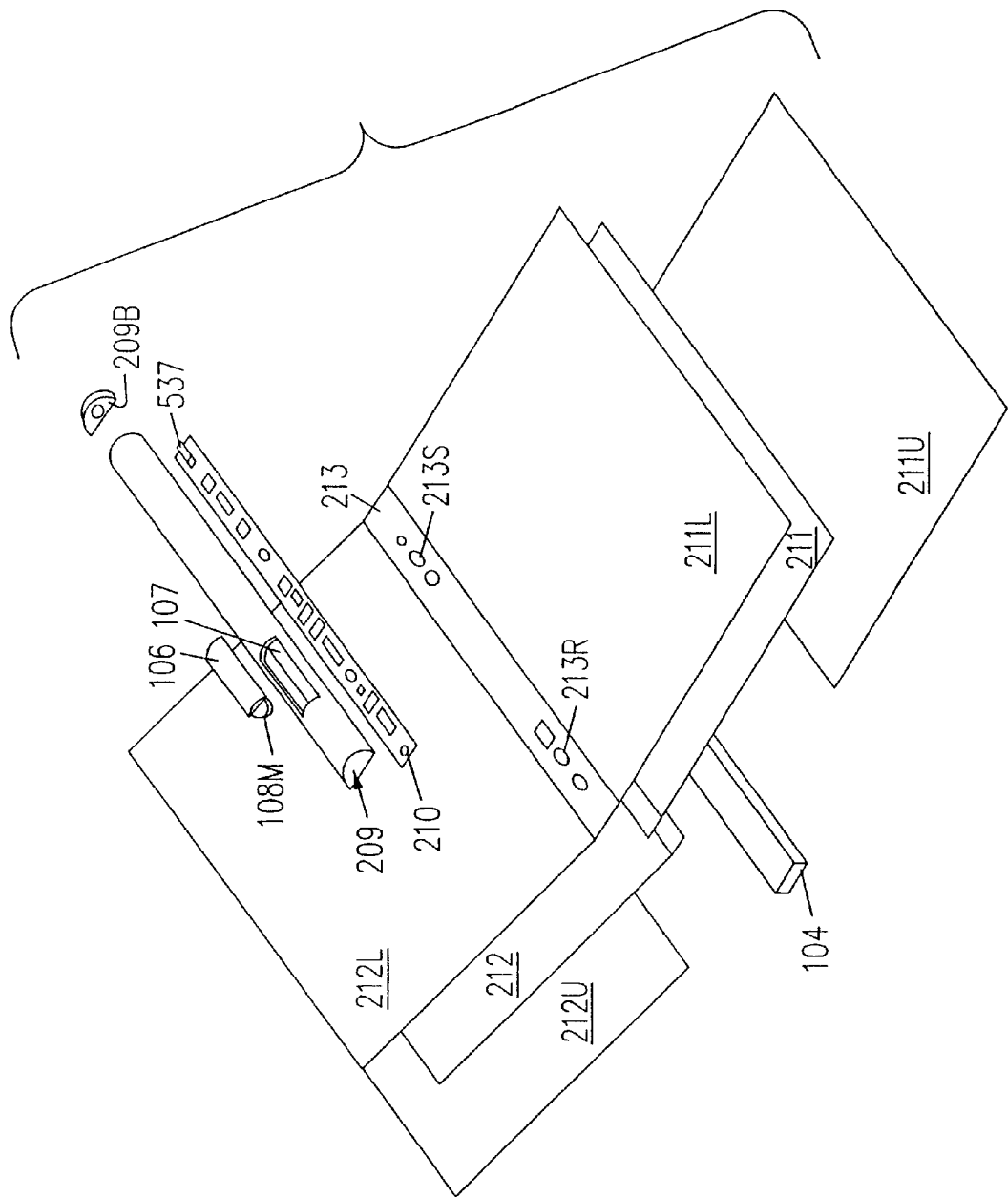

As shown in FIG. 5L, base 530 includes a housing 209 formed of a central section 209C, end pieces 209A and 209B and posts 209R–209S. Housing 209 is formed, for example as a single integral body by injection molding of high density polyethylene (HDPE) plastic material. Posts 209R and 209S are used to support, and if necessary to align the various parts in base 530. For example, posts 209R and 209S pass through holes 210R and 210S in printed circuit board (PCB) 210 included in base 530. PCB 210 in turn supports a remote control circuit including an infrared LED 537 (FIG. 5M). Batteries 108A–108M are located in volume encoded between PCB 210 and housing 209 as illustrated by battery compartment 107 (FIG. 5M).

In one variant of the embodiment, PCB 210 has conductive traces 401, 402 that are formed of, for example, copper directly on PCB 210 as illustrated in FIG. 5N. In another variant of the embodiment, conductive traces 401 and 402 are formed on flexible tape 403 (e.g. by printing carbon ink on MYLAR), and tape 403 is attached (e.g. by an adhesive) to the PCB 210 as illustrated in FIG. 5O. The variant illustrated in FIG. 5N is simple to design but expensive to build, while the variant illustrated in FIG. 5O does not have exposed traces but requires additional parts and additional labor to assemble.

Figure 14:
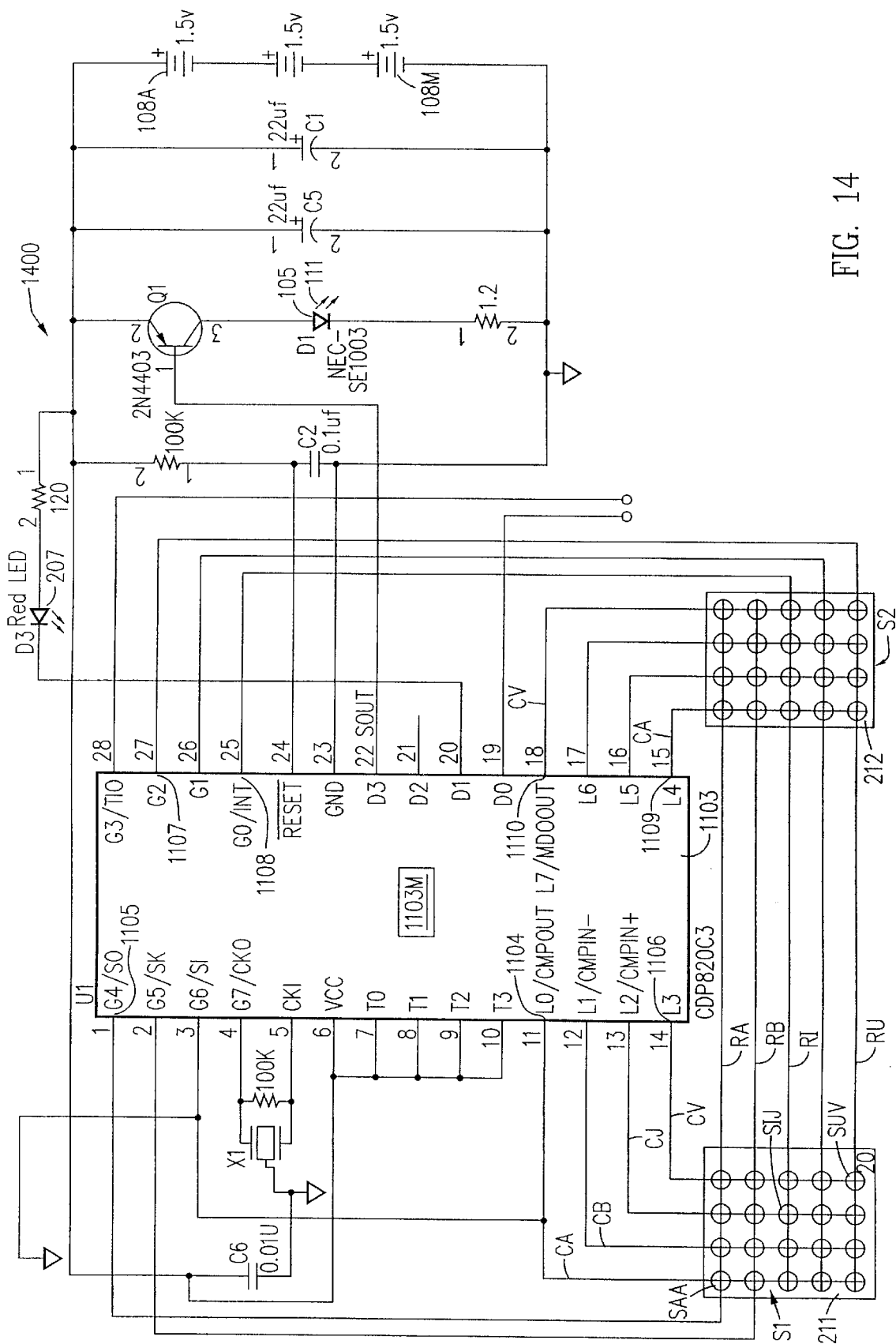

In one variant of the embodiment illustrated in FIG. 5D, each of front cover 531 and back cover 532 includes a touch panel, e.g. touch panels 211 and 212 (FIG. 5L) that are sandwiched between two protective sheets, e.g. sheets 211U and 211L and 212U and 212L respectively. In an alternative variant, each of front cover 531 and back cover 532 includes an array of discrete switches, e.g. arrays S1 and S2 (FIG. 14) formed in substrates 211 and 212 (for convenience, the same reference numerals 211 and 212 are used to indicate touch panels (FIG. 6A) and substrates carrying discrete switch arrays S1 and S2 (FIG. 14).

Sheets 211L and 212L (FIG. 5L) are both attached at the inner edges 211I and 212I respectively to a flexible element, such as a film 213 or a sheet of paper. Film 213 is formed of flexible material, e.g. low density polyethylene (LDPE) plastic material and has a thickness of, for example, ⅛ inch. Use of a film 213 that is separate and distinct from sheets 211L and 212L allows sheets 211L and 212L to have a thickness independent of the thickness of film 213. Therefore, sheets 211L and 212L can have a thickness of, for example, ⅛th inch, or a thickness of ¼th inch, depending on the application. Moreover, sheets 211L and 212L can have a thickness different from each other e.g. sheets 212L can have a thickness twice the thickness of sheet 211L depending on the application.

Sheets 211L and 212L can be formed of any material, e.g. of HDPE plastic material, a chip board, or card stock paper if covers 531 and 532 are rigid. Alternatively, if covers 531 and 532 are flexible, sheets 211L and 212L can be formed of LDPE plastic material, or paper of the same thickness as the paper used to form leaves of the normal magazine. Sheets 211U and 212U are formed sufficiently thin to allow pressure from touching a page of insert 540 (FIG. 5F) to pass through to the underlying touch panel 211 or 212.

In this embodiment, posts 209R and 209S pass through the respective holes 213R and 213S (FIG. 5M) thereby to support film 213 and the attached protective sheets 211L, 211U, 212L and 212U. Posts 109R and 209S also pass through respective holes 211R, 211S in touch panel 211 and holes 212R and 212S in touch panel 212. Finally, posts 209R and 209S also pass through the respective holes 534R and 534S in fastener 534. Holes 534R, 534S, 211R, 211S and 212R, 212S are formed with sufficient accuracy so that each of sheets 211 and 212 is sufficiently aligned with respect to fastener 534, e.g. within the alignment distance d (FIG. 2E).

Figure 3D:
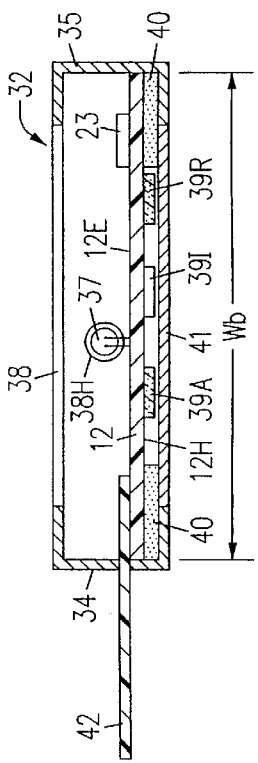
FIG. 3D illustrates, in a cross-sectional view (in the direction 3D—3D in FIG. 2B), one embodiment of the remote control.

In one particular embodiment, a touch panel 12 (FIG. 6A) includes two substrates 601 and 602 formed of, for example, five mils thick MYLAR sheet having an area 8½ by 11 inches. As noted above, one or more integrated circuit dies 39A–39R can be mounted on substrate 602 that forms side 12H of touch panel 12 (FIG. 3D).

Touch panel 12 (FIG. 6A) also includes a number of conductive traces 603A–603N (where N is the number of conductive traces) and an equal number of dielectric traces 604A–604N supported on substrate 601. Specifically, dielectric traces 604A–604N are formed on conductive traces 603A–603N that are in turn formed on substrate 601.

Conductive traces 603A–603N are formed parallel to each other and transverse (e.g. perpendicular) to another set of parallel conductive traces 606A–606P (where P is the number of such conductive traces) formed on substrate 602. Touch panel 12 further includes a set of dielectric traces 605A–605P that are formed on the respective conductive traces 606A–606P. When substrates 601 and 602 are assembled to form touch panel 211, dielectric traces 604A–604N contact dielectric traces 605A–605P thereby to keep each of conductive traces 603A–603N from contacting each of conductive traces 606A–606P.

Dielectric traces 604A–604N and 605A–605P are formed narrower than the respective conductive traces 603A–603N and 606A–606P. The difference in widths between a conductive trace 603I and a dielectric trace 604I (FIG. 6A) allows a conductive trace 603I to contact one of conductive traces 606A–606P depending on the location of an area 607I touched by a user.

Specifically, when a user touches area 607I (shown as a dotted circle in FIG. 6B), a portion of another conductive trace 603I touches a portion of conductive trace 606I, e.g. in the region 608 due to flexing of substrate 601 under pressure exerted by the touch. Such a contact between two transverse conductive traces 603I and 606I closes a switch in a remote control circuit 700 (FIG. 7) and results in the transmission of a wireless signal 111 (FIG. 3B) as described below in reference to FIG. 7.

In one example, a conductive trace 603I (FIG. 6B) has a width W5 of, for example, 145 mils and is made of, for example, carbon ink available as part number 423SS from Atcheson Colloids Company, 1600 Washington Avenue, P.O. Box 611747, Port Huron, Mich. 48061. Dielectric trace 604I has a width W6 of, for example, 25 mils and is formed of, for example, dielectric ink available as part number 452SS also from Atcheson Colloids Company. Two adjacent conductive traces, e.g. traces 603A and 603B (FIG. 6A) are separated from each other by a distance W7 (FIG. 6A) of, for example, 20 mils.

In one particular embodiment, substrates 601 and 602 are formed as two halves of a single integral substrate (not shown) that is folded along a center line (also not shown). When so folded, a dielectric trace 605I (FIG. 6B) supported by substrate 602 contacts another dielectric trace 604I supported on substrate 601 thereby to keep a conductive trace 603I separated from conductive trace 606I by a distance 2T (FIG. 6C), where T (i.e. half of 2T) is the thickness of each of dielectric traces 604I and 605I. In one particular example, thickness T is 1 mil.

Figure 6A:
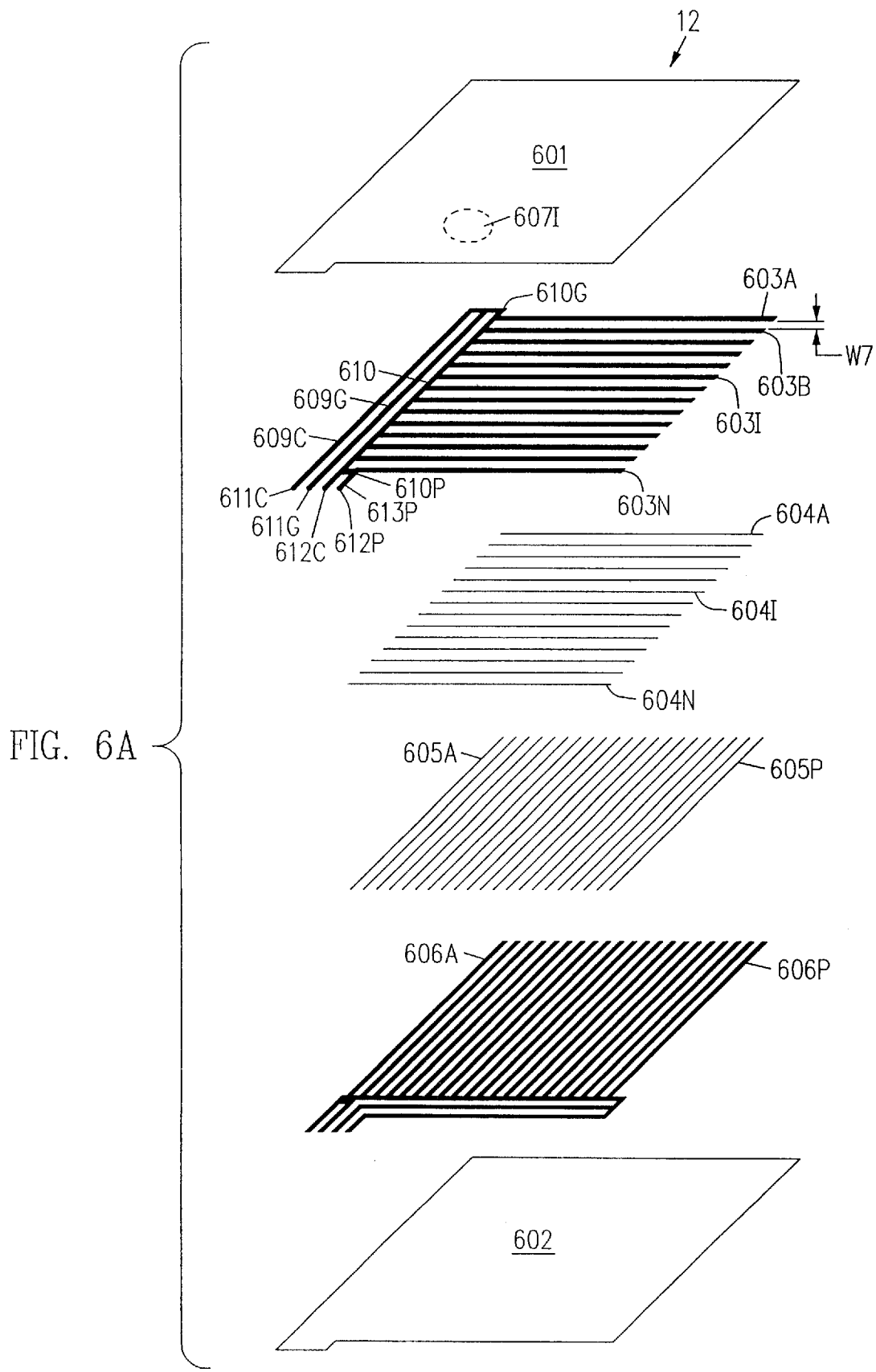
FIG. 6A illustrates, in an exploded view, a touch panel used in the remote control of FIG. 2A.
Figure 6B:
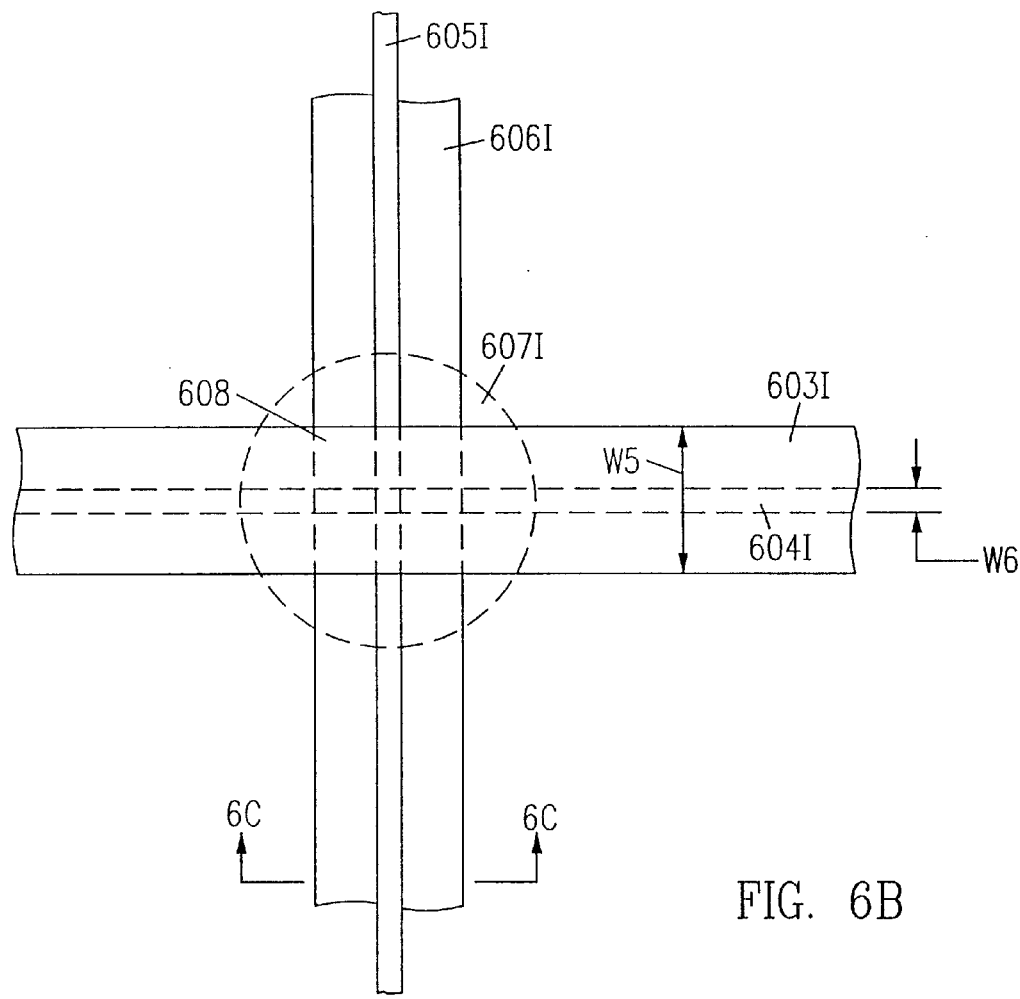
FIG. 6B illustrates, in an enlarged view, the arrangement of the conductive and dielectric traces of FIG. 6A with respect to each other.
Figure 6C:
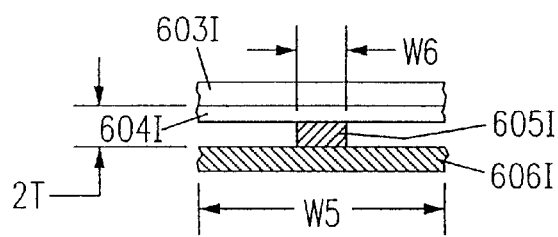
FIG. 6C illustrates, in a cross-sectional view in direction 6C—6C (FIG. 6B), the conductive traces and dielectric traces of FIG. 6B.
Figure 6D:
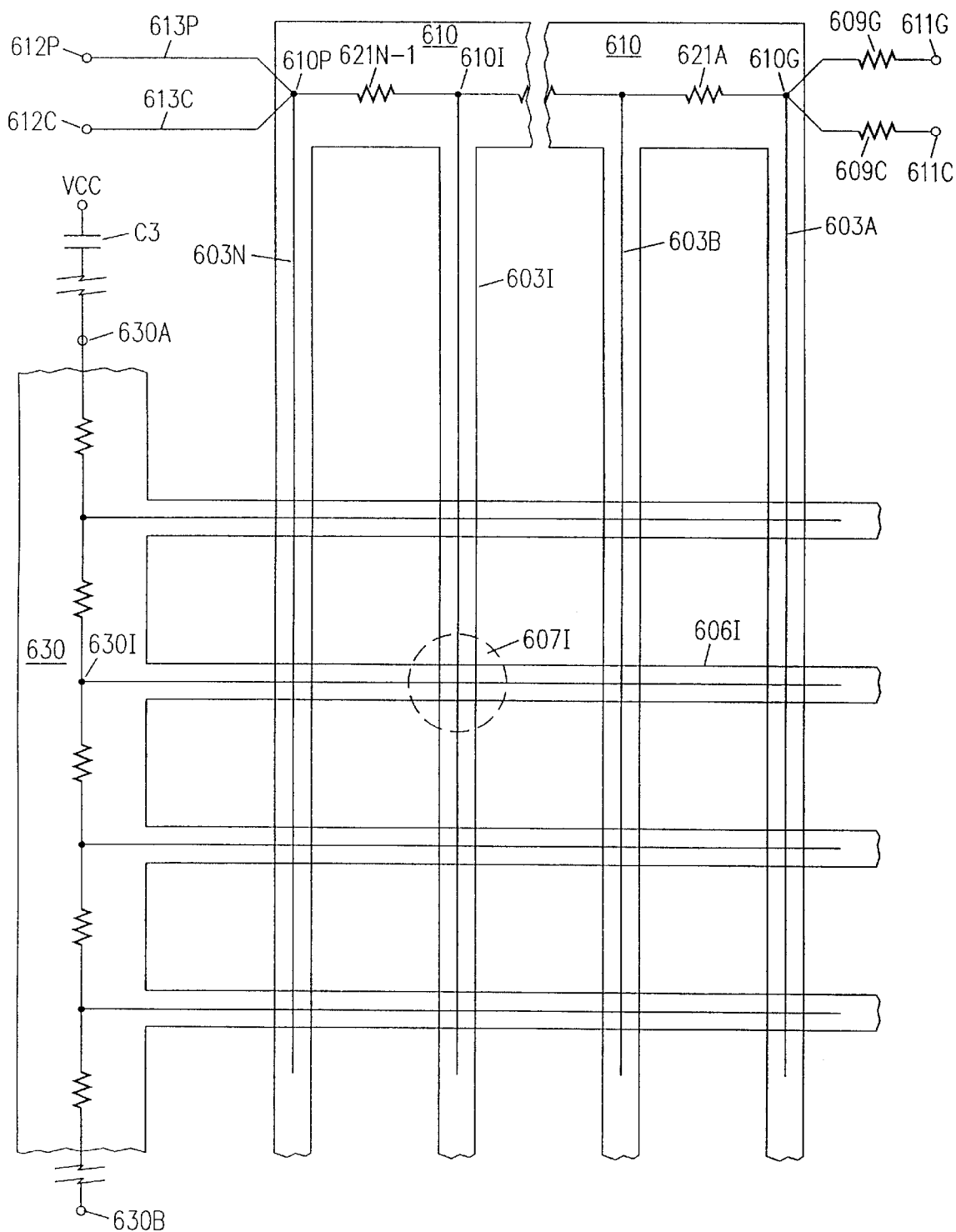
FIG. 6D illustrates, in an enlarged view, the conductive traces of FIG. 6A with a schematic circuit diagram overlaid over the conductive traces.

In the embodiment illustrated in FIG. 6A, each of conductive traces 603A–603N is connected at one end to another conductive trace (also called "resistive backbone trace") 610 that is formed transverse to traces 603A–603N. Therefore traces 603A–603N and trace 610 together form a structure (also called "comb structure") that has the appearance of a comb (commonly used for grooming hair). Trace 610 has a resistance that depends on various parameters of the process and materials used to form trace 610, and the voltage drop across trace 610 depends on the state of batteries 108A–108M (illustrated as battery B1 in FIG. 7) at the time touch panel 211 is used. The resistance of trace 610 (FIG. 6D) is modeled by resistors 621A . . . 621N−1 located between parallel traces 603A . . . 603N (FIG. 6D).

The resistance value of resistors 621A . . . 621N−1 is determined in a calibration step by coupling a terminal 610G of trace 610 to a source of the ground reference voltage and another terminal 610P of trace 610 to a source of the reference voltage VCC, while measuring the voltage at terminals 610P and 610G. The voltage measurements at terminals 610P and 610G are converted by an analog-to-digital converter (see converter 701 in FIG. 7) into a count with a maximum count corresponding to the voltage at terminal 610P and a minimum count corresponding to the voltage at terminal 610G. A microcontroller 703 (FIG. 7) included in circuit 700 scales the difference between the maximum count and the minimum count into the range 0–255, and thereafter transmits to host device 120 (FIG. 2B) a scaled value in range 0–255 to indicate the location of touched area 607I (FIG. 6D) along resistive backbone trace 610. Microcontroller 703 performs a similar calibration step for a resistive backbone trace 630 that is connected to each one of conductive traces 606A–606P.

During the calibration steps, the voltage measurements are taken at terminals 612C and 611C (FIG. 6D) that are connected to terminals 610P and 610G respectively by traces 613C and 609C. Traces 613C and 609C have lengths that are at least approximately equal to (in one embodiment exactly equal to) the respective lengths of traces 613P and 609G that couple terminals 610P and 610G to respective terminals 612P and 611G. Terminals 612P and 611G are coupled to sources of reference voltage VCC and the ground reference voltage respectively. Specifically, traces 613C and 613P are kept at lengths approximately equal to each other (and the lengths of traces 609C and 609G are also kept approximately equal to each other), so that a parasitic resistance in trace 613P is balanced by a similar parasitic resistance in trace 613C (and parasitic resistance's in traces 609G and 609C also balance each other), thereby to ensure that calibration measurements are accurate.

The calibration steps ensure accuracy in measurement of the location of touch area 607I (FIG. 6D) and also ensure use of the entire range 0–255. The calibration steps are performed each time touch panel 211 is touched, prior to measuring voltages at nodes 630I and 610I for touch measurements (to determine the location of area 607I). Repeated performance of calibration steps (at each touch) eliminates inaccuracies in touch measurements, for example, due to a variation in environmental parameters (such as temperature, humidity), due to battery discharge, and due to variations in resistance.

Figure 7:
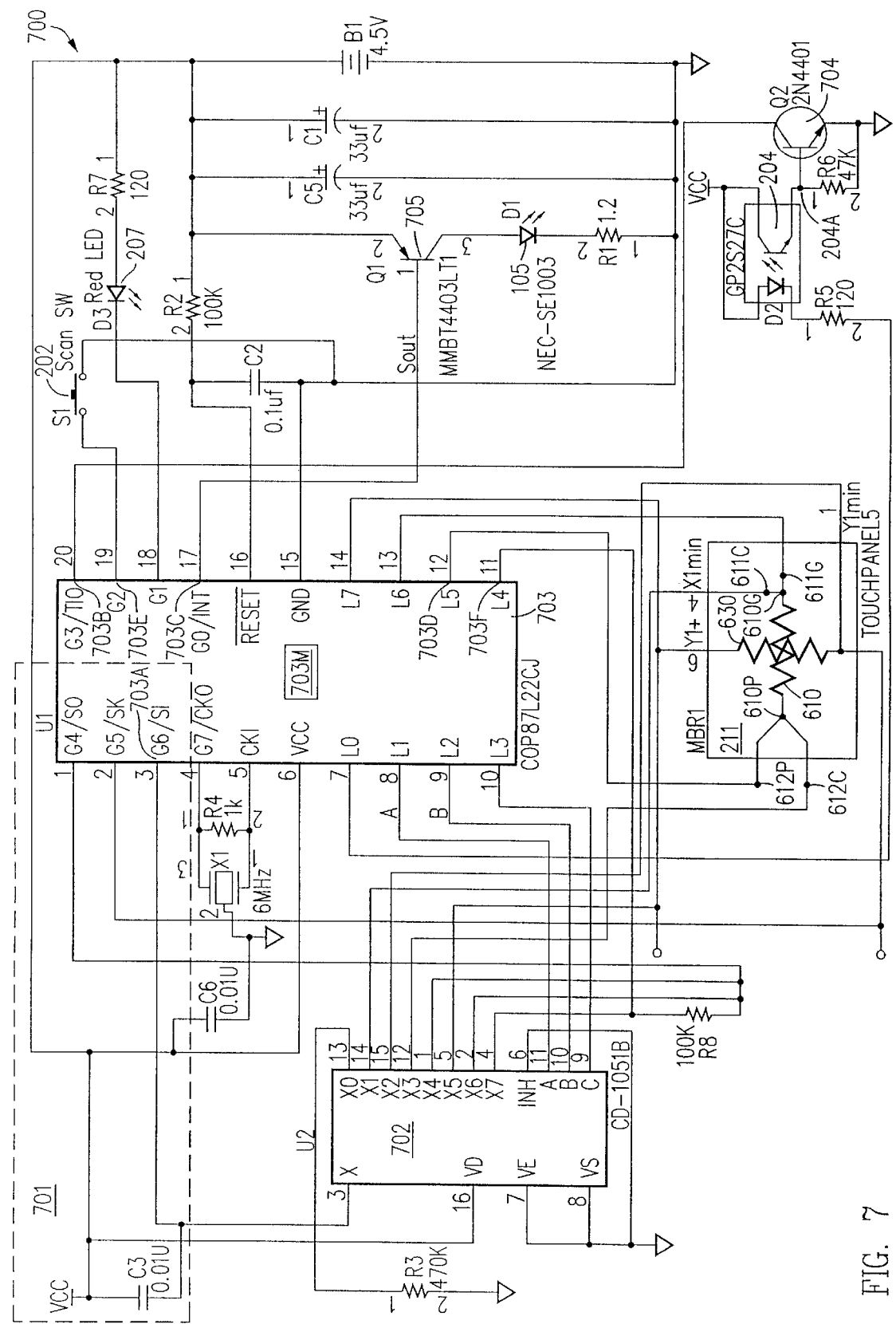
FIG. 7 illustrates, in a schematic circuit diagram, a remote control circuit included in the remote control of FIG. 2A.

In one particular embodiment, a single analog to digital converter 701 (FIG. 7) and an analog multiplexer 702 perform all of the above-described measurements under the control of microcontroller 703. During initialization, capacitor C3 (FIG. 7) is fully charged to reference voltage VCC, by analog multiplexer 702 coupling a first terminal (not labeled) of capacitor C3 to a source of the ground reference voltage through resistor R3 (FIG. 7). A second terminal (also not labeled) of capacitor C3 is permanently connected to a source of the reference voltage VCC.

Each of the measurements (i.e. the calibration measurements and the touch measurements) are performed in two steps. First, a node 610I (FIG. 6D) of trace 610 is coupled through area 607I, node 630I, a portion of resistive backbone trace 630 and a terminal 630A to capacitor C3 by an analog multiplexer 702 (not shown in FIG. 6D; see FIG. 7) controlled by microcontroller 703. Terminal 630B of backbone trace 630 is left floating so that the voltage at node 630I is identical to the voltage V at node 610I at steady state. Microcontroller 703 maintains the link between capacitor C3 and node 610I until capacitor C3 is discharged to the voltage V at node 610I (i.e. steady state). In one particular example, microcontroller 703 maintains the link for one hundred milliseconds. Once capacitor C3 reaches steady state, the voltage at each of capacitor C3, terminal 630A, node 630I, terminal 630B and node 610I is the same, and no current flows through backbone trace 630 and conductive traces 606I and 603I (FIG. 6D).

During the second step, the first terminal of capacitor C3 is coupled by analog multiplexer 702 through a resistor R3 to a source of the ground reference voltage. When capacitor C3 is coupled to the ground reference voltage source, microcontroller 703 starts measuring a time period (in terms the number of clock cycles, also called "counts") required by capacitor C3 to charge to a threshold voltage of an input pin 703A in microcontroller 703. The measured duration is indicative of the voltage at node 610I, e.g. the measured duration is proportional to the difference between the voltage at node 610I and the threshold voltage. In a similar manner, microcontroller 703 determines another duration that is indicative of the voltage at node 630I. The two durations indicate the Cartesian coordinates x, y of area 607I touched by the user.

As noted above, prior to determining the x, y coordinates of area 607I, microcontroller 703 calibrates touch panel 211 by (1) measuring the voltages (in terms of duration) at terminals 612C and 611C (FIG. 7) which represent the two endpoints of resistive backbone trace 610 and (2) mapping the measurements to 255 and 0 respectively to determine a scaling factor (including, for example, a slope and an offset). Thereafter, microcontroller 703 uses the scaling factor to map the measured x, y coordinates into the range 0–255. Next, microcontroller 703 transmits the mapped x, y coordinates to host device 120 in wireless signal 111 (FIG. 3B), as described below in reference to FIG. 9.

In the embodiment of FIG. 7, analog multiplexer 702 couples capacitor C3 to either the source of ground reference voltage, or to a terminal of touch panel 211 (through terminals X1–X7 of analog multiplexer 702), in response to a control signal from microcontroller 703 at one of terminals A–C of analog multiplexer 702.

Remote control circuit 700 also includes a bar code scanner 204 having a terminal 204A coupled to a base of an npn transistor 704 (FIG. 7). The collector of transistor 704 is connected to an input pin 703B of microcontroller 703. Microcontroller 703 includes an internal pull up resistor (not shown) that is coupled to the source of reference voltage VCC at one end and to pin 703B at the other end. The emitter of transistor 704 is connected to the source of ground reference voltage. A resistor R6 is connected to terminal 204A of scanner 204 to form a voltage follower using a phototransistor (not labeled) in scanner 204.

Figure 8:
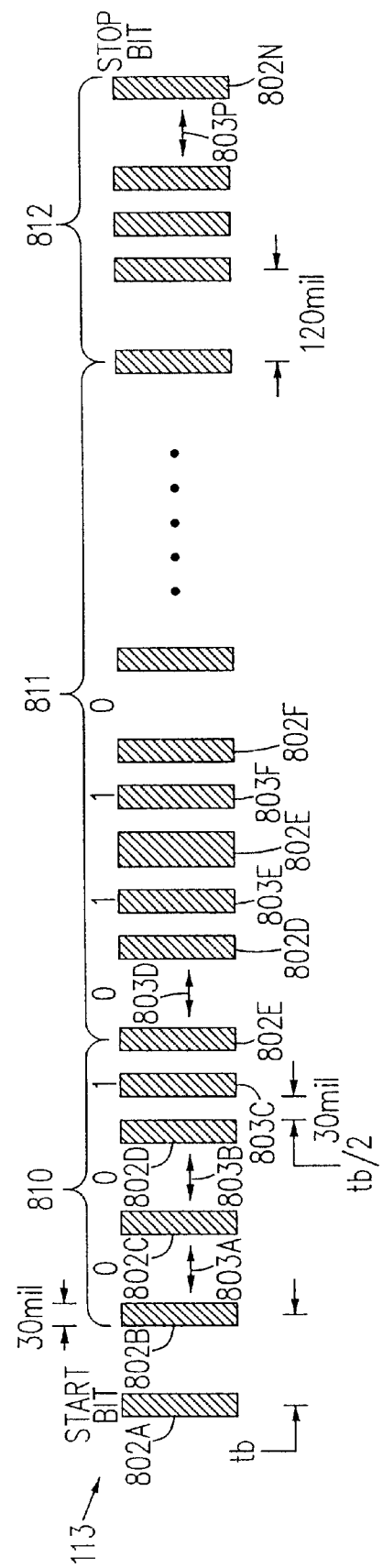
FIG. 8 illustrates, in a timing diagram, the pattern 113 carried by card 11 of FIG. 2A.

When a black bar in bar code pattern 113 (FIG. 8) is being read, light from a light emitting diode (also called "LED"; not labeled) in scanner 204 (FIG. 7) fails to reach the phototransistor (again not labeled) in an amount sufficient to raise the voltage at terminal 204A above the threshold voltage required by transistor 704. Therefore transistor 704 remains off and the collector of transistor 704 remains at the reference voltage VCC. When there is no black bar in bar code pattern 113 (FIG. 8), sufficient light from the LED in scanner 204 (FIG. 7) reaches the phototransistor to cause the voltage at terminal 204A to go above the threshold voltage of transistor 704. In response to the increase in voltage, transistor 704 turns on and couples input pin 703B to the source of ground reference voltage. Microcontroller 703 monitors the voltage at input pin 703B, and thereby reads bar code pattern 113 (FIG. 8).

In an example of circuit 700, analog multiplexer 702 (FIG. 7) is part CD4051B and microcontroller 703 is part COP87L22CJ, both available from NATIONAL SEMICONDUCTOR CORPORATION. In this example, scanner 204 is part GP2527C available from SHARP CORPORATION.

Bar code pattern 113 (FIG. 8) includes a number of frame bars 802A–802N and a number of data locations 803A–803P that are interspersed among frame bars 802A–802N. Frame bars 802A–802N and data locations 803A–803P are grouped into three fields, a header field 810, a data field 811 and a checksum field 812. When a user inserts rail 112 into rail 104 (FIG. 2C), microcontroller 703 (FIG. 7) first reads header field 810 (FIG. 8).

Microcontroller 703 uses frame bars 802A and 802B in header field 810 to establish a time period (hereinafter "time base") that indicates the bit rate at which bar code pattern 113 (FIG. 8) is being read by scanner 204 (FIG. 7). Microcontroller 703 also uses header 810 to determine that barcode pattern 113 is being read correctly by checking for a predetermined bit sequence. For example header field 810 (FIG. 8) includes at data locations 803A, 803B and 803C, bits 0, 0 and 1 that form a predetermined bit sequence, where each 0 value is represented by the absence of a black bar, and the 1 value is represented by the presence of a black bar.

In an alternative embodiment, pattern 113 is not printed as a barcode on an insert, and instead is formed by holes, wherein each 0 value is represented by the absence of the hole, and the 1 value is represented by the presence of a hole. Scanner 204 works in the same manner irrespective of whether pattern 113 is formed by the printing of a barcode or by the punching of holes.

If microcontroller 703 does not detect the predetermined bit sequence, microcontroller 703 (FIG. 7) operates LED 207 (in this particular embodiment a red colored LED) to indicate to the user that an error occurred during the reading of bar code pattern 113 (FIG. 8).

Specifically, when leaf 11 is inserted into base 32, microcontroller 703 (FIG. 7) first detects a first frame bar (also called "start bit") 802A (FIG. 8) and starts measuring a duration tb (hereinafter "time base") up to the next frame bar 802B. Time base tb (FIG. 8) when halved indicates the time at which the next data location 803A occurs. Therefore, on detecting frame bar 802B, microcontroller 703 waits for duration tb/2 and samples the data location 803A.

Thereafter, when microcontroller 703 detects the next bar, i.e. frame bar 802C, microcontroller 703 again measures the duration between frame bars 802B and 802C and uses the measured duration as the new time base tb to sample the next data location 803B. Microcontroller 703 proceeds in this manner to read the entire bar code pattern 113 (FIG. 8) using a currently determined time base to sample the next data location. Microcontroller 703 also uses the currently determined time base to sample the next frame bar, within a window around the expected location, e.g. a 50% variation in the expected location, i.e. a 25% variation in each direction of the expected location.

Remote control circuit 700 (FIG. 7) also includes a pnp transistor 705 that has an emitter coupled to a source of a reference voltage VCC (e.g., battery B1), a base coupled to a terminal 703C of microcontroller 703 and a collector coupled to an anode of infrared LED 105. The cathode of infrared LED 105 is coupled through a resistor R1 to the source of ground reference voltage. To transmit a wireless signal 111 (FIG. 3B), microcontroller 703 (FIG. 7) drives a signal on terminal 703C low, thereby to turn on transistor 705, and transistor 705 conducts current drawn by infrared LED 105, thereby to cause the transmission of a bit 1 in wireless signal 111. Similarly, microcontroller 703 drives a signal on terminal 703C high, thereby to turn off transistor 705 and cause transmission of a bit 0 in signal 111. Resistor R1 limits the current through infrared LED 105. Capacitors C1 and C5 filter out noise otherwise caused by the turning on and turning off of transistor 705 in the power supplied to microcontroller 703 by battery B1.

Figure 9:
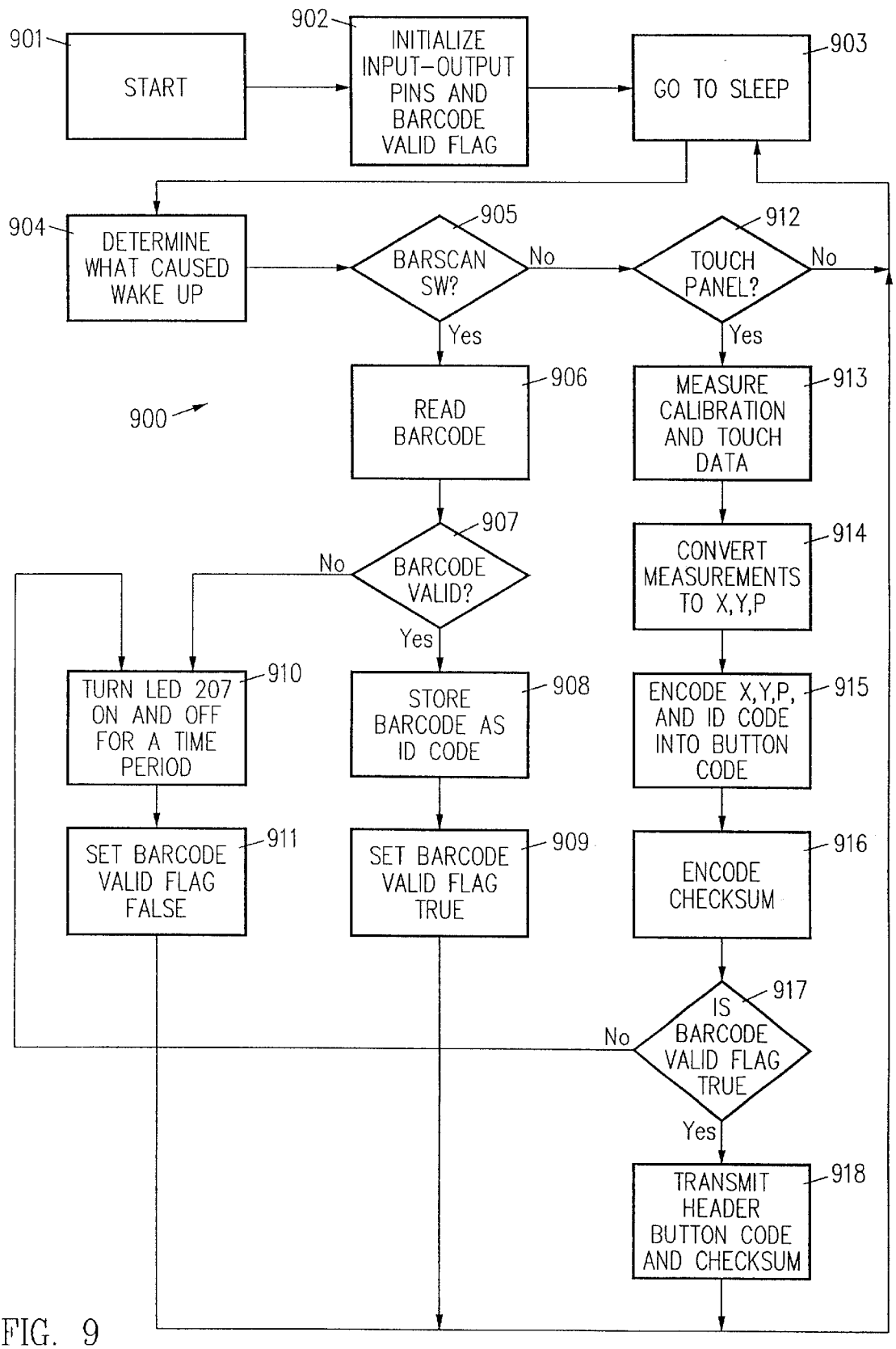
FIG. 9 illustrates, in a flow chart, various steps performed by the microcontroller of FIG. 7.

In one particular embodiment, microcontroller 703 performs the steps of method 900 (FIG. 9). Specifically, on being powered up, microcontroller 703 starts in step 901 and goes to step 902. In step 902, microcontroller 703 (FIG. 7) initializes various pins, such as input pins 703A, 703B, 703D, 703E and 703F and output pin 703C. In step 902 (FIG. 9), microcontroller 703 also sets a flag (hereinafter "bar code valid flag"), to be false (e.g. to the value 0). Thereafter, microcontroller 703 goes to sleep in step 903.

On being woken up, for example due to a signal transition on an input pin, such as pin 703D that is connected to terminal 612P of touch panel 211 (FIG. 7), microcontroller 703 goes to step 904 (FIG. 9). In step 904, microcontroller 703 determines which of input pins 703A, 703B, 703D, 703E and 703F (FIG. 7) was subjected to a signal transition. Thereafter, microcontroller 703 goes to step 905 (FIG. 9) to check if bar code scanner 204 is to be activated.

For example, in step 905, microcontroller 703 checks if a signal transition occurred at pin 703E (FIG. 7) that is connected via switch 202 to the source of a ground reference voltage. If a signal transition was caused by closing of switch 202 (e.g. on insertion of rail 112 into rail 104; see FIG. 2C), microcontroller 703 goes to step 906 (FIG. 9). In step 906, microcontroller 703 operates bar code scanner 204 (FIG. 7) to read a bar code pattern 113 in the manner described above in reference to FIG. 8.

Thereafter, microcontroller 703 goes to step 907 to check if bar code pattern 113 read by scanner 204 is valid. For example, microcontroller 703 checks to see if the bits 0, 0 and 1 of the predetermined sequence were received in a header field 810 (described above). Moreover, microcontroller 703 calculates a check sum from bits received in data field 811 (FIG. 8), and compares the calculated check sum with a check sum received in checksum field 812.

In one particular example, microcontroller 703 calculates the check sum by counting the number R of data bits having the value 1. Thereafter, microcontrollers 703 divides number R by 3 repeatedly, until the remainder becomes 0, and uses the last remainder LR before the remainder becomes 0, by adding 1, e.g. LR+1 as the check sum that is used to verify integrity of the bar code pattern 113. If header field 810 and checksum field 812 contain the expected bits, microcontroller 703 goes to step 908 and stores a number derived from bar code pattern 113 in a memory 703M as an identification code to be transmitted in wireless signal 111 (FIG. 3B). Thereafter, microcontroller 703 goes to step 909 and sets bar code valid flag true (e.g. a value 1), and then goes to sleep in step 903.

In step 907, if microcontroller 703 finds an error in either header field 810 (FIG. 8) or in checksum field 812, microcontroller 703 goes to step 910. In step 910, microcontroller 703 turns LED 207 (FIG. 7) on and off alternately, (e.g. every 0.5 second) thereby to create a visible blinking light signal (e.g. of red light) that indicates to a user that an error occurred. Microcontroller 703 turns LED 207 on and off for a predetermined time period, e.g. 5 seconds. Thereafter, microcontroller 703 goes to step 911, sets the bar code valid flag to be false and then goes to sleep in step 903.

In step 905, if a signal transition (e.g. an increase in voltage) did not occur at pin 703E (FIG. 7), microcontroller 703 goes to step 912 to check if a signal transition occurred on one of pins 703D and 703F. If a signal transition occurred on one of pins 703D and 703F, microcontroller 703 goes to step 913 to perform the calibration measurements and touch measurements as described above in reference to FIG. 6D. Thereafter, microcontroller 703 goes to step 914 and scales durations for the x, y coordinates measured in step 913 into values in the range 0–255 as described above, for transmission to host device 120 (FIG. 2B).

Microcontroller 703 also sets a variable P to be, for example 0. Thereafter, microcontroller 703 goes to step 915 and encodes the variables e.g. x, y, P, and the identification code (determined in step 908 described above) to form a button code to be transmitted in wireless signal 111 (FIG. 3B). For example, in step 915, microcontroller 703 simply arranges value of variables x, y, P and identification code into a bit sequence to form the button code. Thereafter, microcontroller 703 goes to step 916 and computes a check sum as described above in reference to checksum field 812 (FIG. 8) of bar code pattern 113.

Next, microcontroller 703 goes to step 917 (FIG. 9) and checks to see if the bar code valid flag is true. If the bar code valid flag is true, microcontroller 703 goes to step 918 and transmits in wireless signal 111 (FIG. 3B) a header (e.g. a predetermined bit pattern), the button code, and the check sum determined in steps 915 and 916. In step 918, microcontroller 703 operates infrared LED 105 as described above. Thereafter, microcontroller 703 goes to sleep in step 903.

In step 917, if the bar code valid flag is false, microcontroller 703 goes to step 910 described above. A bar code valid flag can be false not only because a bar code pattern had an error, but for a variety of other reasons. For example, the bar code valid flag may be false if switch 202 is not activated (due to a mechanical failure) during insertion of rail 112 into rail 104 (FIG. 2C). Moreover, the bar code valid flag is false when batteries 108–108M (FIG. 2D) are replaced because microcontroller 703 is reset, starts in step 901, and initializes the bar code valid flag to be false in step 902. Therefore, if insert 31 (FIG. 1) was already coupled to base 32 prior to the replacement of batteries 108A–108M (FIG. 2D), the user must detach insert 31 from base 32 and reattach insert 31 to base 32 thereby to cause bar code pattern 113 (FIG. 8) to be read once again.

Finally, when a user removes insert 31 (FIG. 1) from insert 32, during the removal process a button 202 (FIG. 7) is once again closed, thereby triggering microcontroller 703 to read bar code pattern 113. However, during the removal process, bits in bar code pattern 113 are read in the reverse order, e.g. a last bit (also called "stop bit") 802N (FIG. 8) is read first, thereby causing an error in step 907 when checksum field 812 includes, e.g., frame bar 802A, thereby to cause microcontroller 703 to go from step 907 (FIG. 9) to step 910 and indicate an error. As microcontroller 703 sets bar code valid flag to be false in step 911 during the removal process, operation of touch panel 211 (FIG. 7) after removal of insert 31 (FIG. 1) causes microcontroller 703 to take the "no" branch from step 917 to step 910.

In an alternative embodiment, a remote control 50 (FIG. 5A) does not have remote control circuit 700 (FIG. 7) and rather has remote control circuit 1100 (FIG. 11) that includes a number of discrete switches.

The alternative embodiment is cheaper to manufacture, because an analog multiplexer 702 (FIG. 7) required by the touch panel is eliminated by use of discrete switches. However, a touch panel embodiment can be made cheaper than the discrete switches embodiment if analog multiplexer 702 is built into a microcontroller, e.g. by use of a custom chip.

Discrete switches SAA-SUV are formed in one embodiment by a number of conductive traces CA-CV (where $A \leq J \leq V$) formed on a left portion 1001 of a substrate 1000, and conductive traces RA-RU (where $A \leq I \leq U$) formed on a right portion 1002 of substrate 1000. Substrate 1000 can be formed of, for example, MYLAR, and the conductive traces CA-CV and RA-RU can be formed of, for example, carbon ink available from Atcheson Colloids.

Figure 10A:
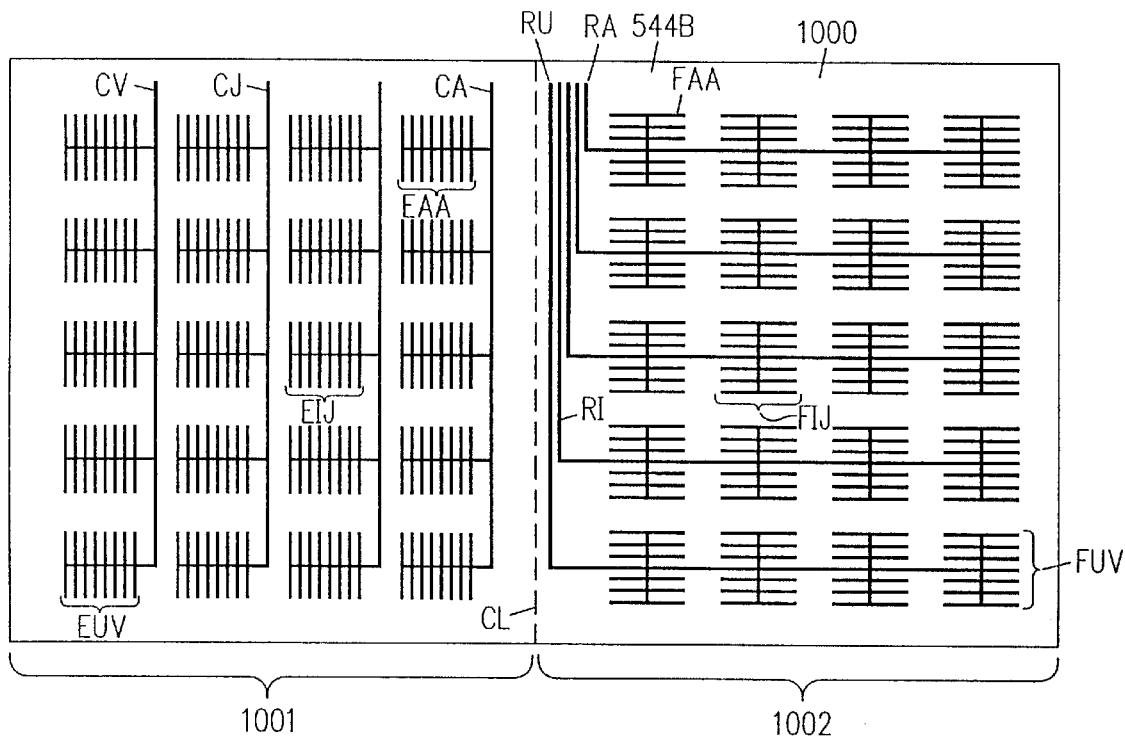
FIGS. 10A and 10B illustrate, in a plan view, conductive traces and dielectric traces of an array of switches (used instead of touch panel) in the remote control of FIG. 4A.

Each of conductive traces CA-CV and RA-RU is connected to a number of switch portions EAA-EUV and FAA-FUV respectively, as illustrated in FIG. 10A. Switch portions EAA-EUV and FAA-FUV are formed so that when substrate 1000 is folded at center line CL, left portion 1001 is overlaid on right portion 1002 and a switch portion EIJ on left portion 1001 overlaps a switch portion FIJ on right portion 1002, thereby to form a switch SIJ (FIG. 11). Portions EAA-EUV and FAA-FUV are formed as a comb structure, with teeth in switch portion EIJ on being formed transverse to the teeth of switch portion FIJ. Each comb structure is formed in a square area having a width of, e.g. 0.4 inch.

Figure 10B:
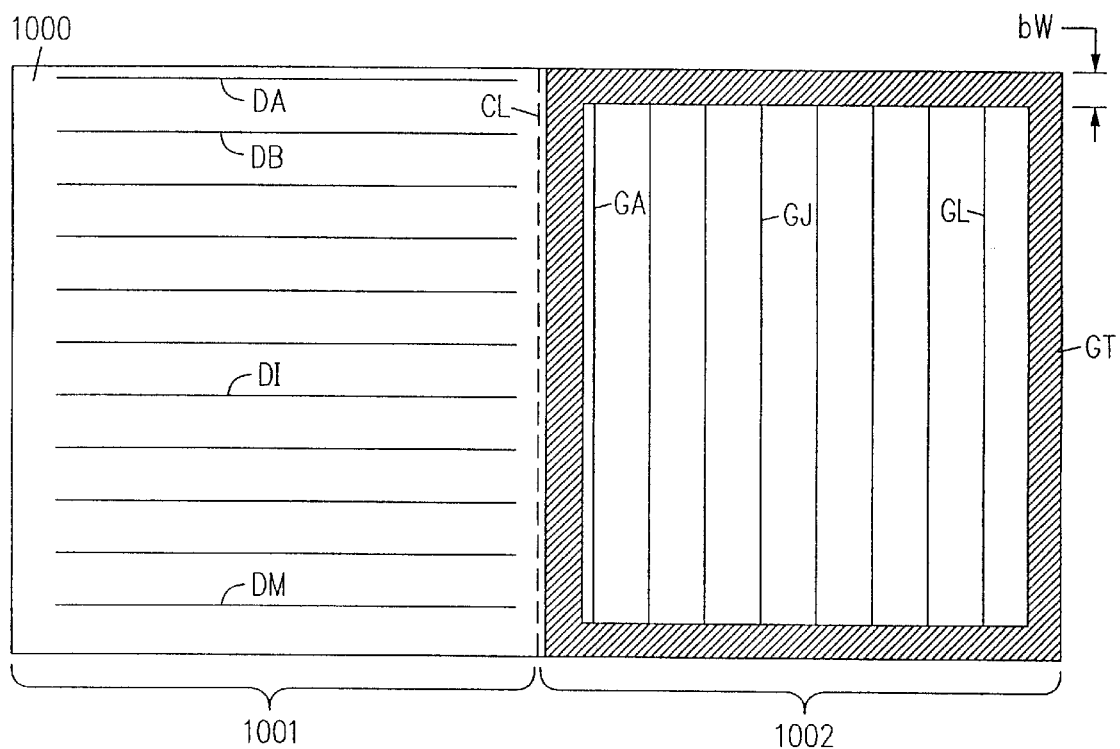

Also included in switches S1 are a number of dielectric traces DA-DM (FIG. 10B) and GA-GL that are supported by portions 1001 and 1002 of substrate 1000 e.g. formed over conductive traces CA-CV and RA-RU and switch portions EAA-EUV and FAA-FUV (that are not shown for clarity in FIG. 10B). In the embodiment illustrated in FIG. 10B, also formed on right portion 1002 is a trace (called "border trace") of dielectric material having a width bw of, for example, 0.25 inch. Width of each of conductive traces CA-CV and RA-RU, and switch portions EAA-EUV and FAA-FUV can be, for example, 25 mils. Moreover, dielectric traces formed of, for example, dielectric ink (described above) can also be, for example, of width 25 mils. In this particular embodiment, the width of conductive traces DA-DM, GA-GL is independent of the width of conductive traces CA-CV and RU-RV.

Remote control circuit 1100 is similar or identical to the above-described remote control circuit 700 (FIG. 7), except for the differences noted below. Specifically, remote control circuit 1100 includes a switch array S2. In an array S2, each of switches SAA-SUV (where array S2 has U rows and V columns) is coupled to two pins of microcontroller 1103. For example, switch SAA is coupled by a trace RA to pin 1105 and by a trace CA to pin 1109. Similarly, switch SUV is coupled by to pin 1107 and to pin 1110. Such discrete switches are available from, e.g. Henri Membrane Switch Manufacturing Co., 5/F No. 112 Wu-Kung Road, Wu-Ku Industrial Park, Wu-Ku Hsiang, Taipei, Taiwan, ROC, Phone; (886) 2 2990096. In one implementation, microcontroller 1103 is part COP820CJ available from National Semiconductor Corporation.

In another embodiment, row traces RA-RU are formed on one sheet and column traces CA-CV are formed in another sheet (individual sheets are not shown in FIG. 11) and the two sheets are kept separate from each other by, e.g. small nipples, until pressure is applied e.g. by touching. Such discrete switches are described in, e.g. U.S. patent application, Ser. No. 08/269,492 incorporated by reference above.

Microcontroller 1103 determines that a switch, e.g. switch SIJ (where $A \leq I \leq U$ and $A \leq J \leq V$) is closed by coupling one of the traces, e.g. column trace CJ to a source of the reference voltage VCC, and the other of the traces, e.g. row trace RI to an internal pulldown resistor (not shown), and the resistor is in turn coupled to a source of the ground reference voltage.

Initially, when switch SIJ is open, row trace RI is at 0 volts due to being coupled to the ground reference voltage source. Microcontroller 1103 waits for a signal transition on trace RI e.g. monitors a terminal 1108 that is coupled the row trace. When switch SIJ (FIG. 14) is closed, switch SIJ connects column trace CJ to row trace RI, thereby to cause a signal transition on terminal 1108, e.g. from logic level 0 to logic level 1 (i.e. to the reference voltage VCC from the ground reference voltage). Note that circuitry 1400 in FIG. 14 operates in a manner similar or identical to circuitry 1100 in FIG. 11, except that circuitry 1400 includes two touch panels S1 and S2.

Figure 12:
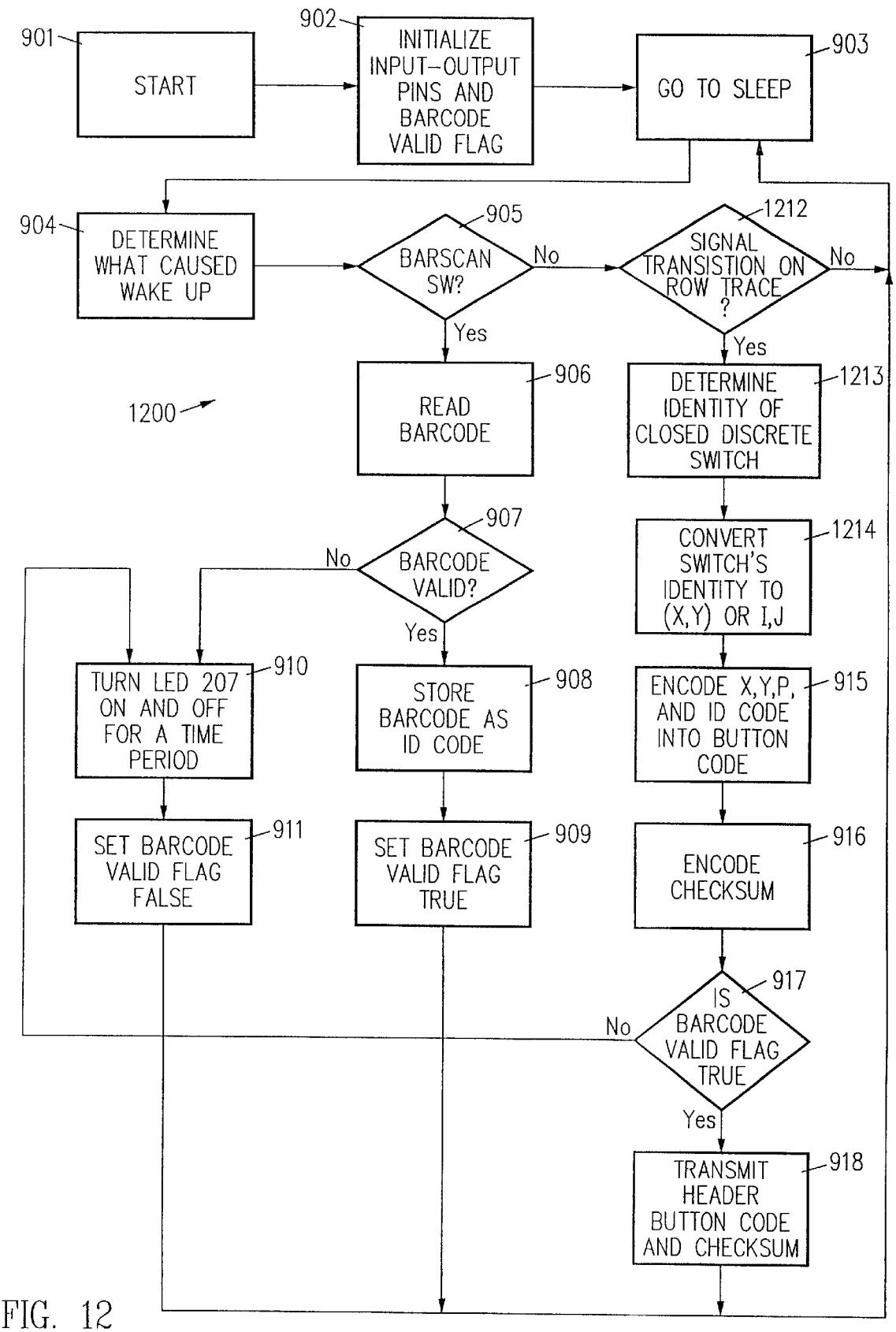
FIG. 12 illustrates, in a flow chart, various steps performed by the microcontroller shown in FIG. 11.
Figure 13:
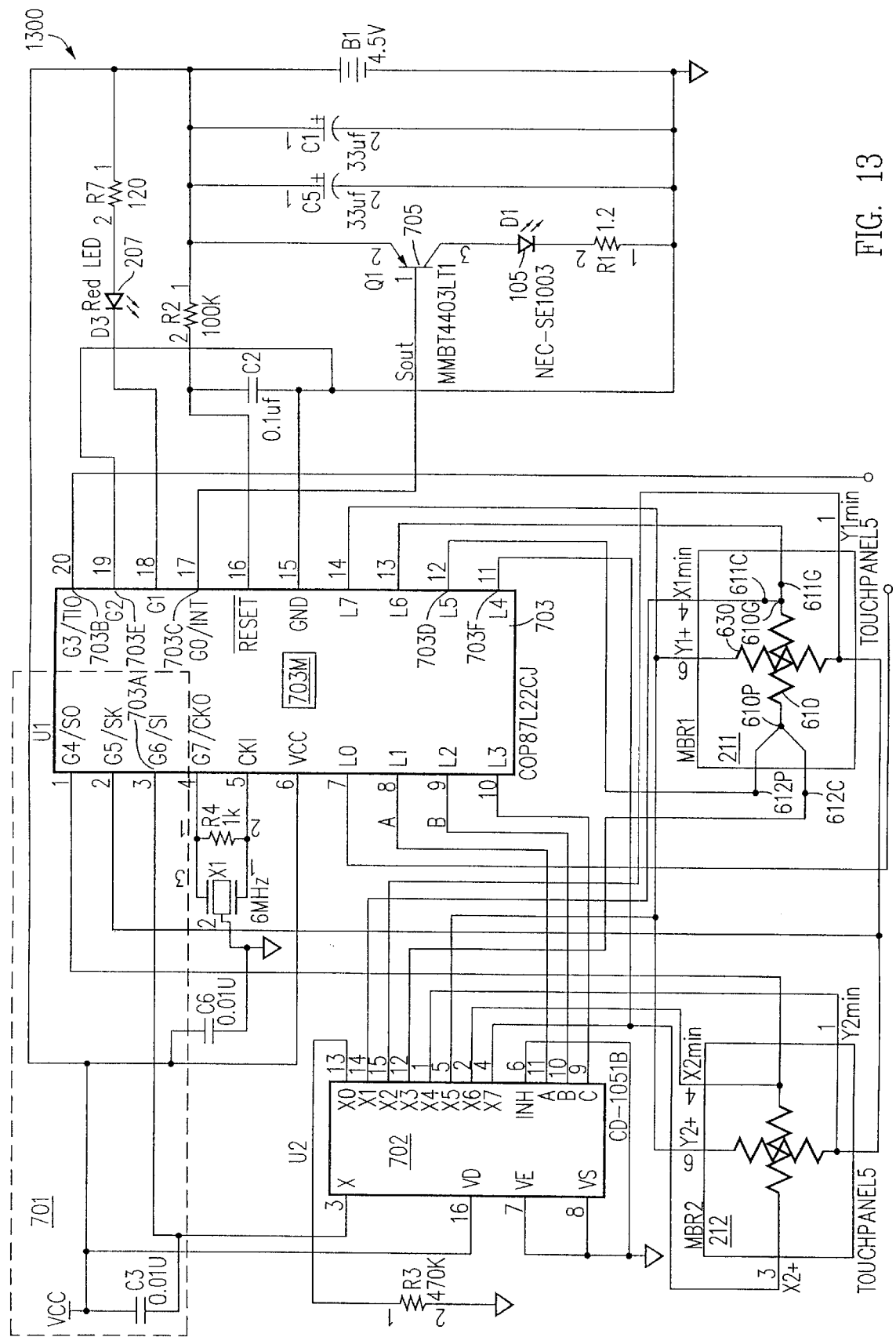
FIGS. 13 and 14 illustrate schematic circuit diagrams that are similar to the respective diagrams in FIGS. 7 and 11, except for having two touch panels and not having a bar code scanner as required by base 530 (FIG. 5E).

In one embodiment, microcontroller 1103 performs the steps of a method 1200 (FIG. 12) that is similar or identical to the above-described method 900, except for the steps discussed below. Specifically, instead of steps 912–915, method 1200 includes steps 1212–1215. In step 1212, microcontroller 1103 checks to see whether any one of the terminals connected to one of row traces RA-RU experienced a signal transition. If not, microcontroller 1103 takes the "NO" branch from step 1212.

However, if there was a signal transition, microcontroller 1103 goes to step 1213. In step 1213, microcontroller 1103 determines the identity of a closed switch SIJ, in the manner described above. Thereafter, microcontroller 1103 goes to step 1114 and converts the identity of switch SIJ into, for example, the cartesian coordinates x, y mapped into the range 0–255. In another variant of the embodiment, microcontroller 1103 merely translates the identity of switch IJ into the row I and column J.

Next, in step 1115, microcontroller 1103 encodes the identity of switch SIJ, e.g. the x, y coordinates and a variable P that is set to 0 if a switch in array S1 is closed, and set to 1 if a switch in array S2 is closed. Microcontroller 1103 encodes the variables x, y, P and an identification code into a button code in a manner similar to that described above in reference to step 915. Thereafter, microcontroller 1103 performs the above-described steps, e.g. step 916.

Figure 15A:
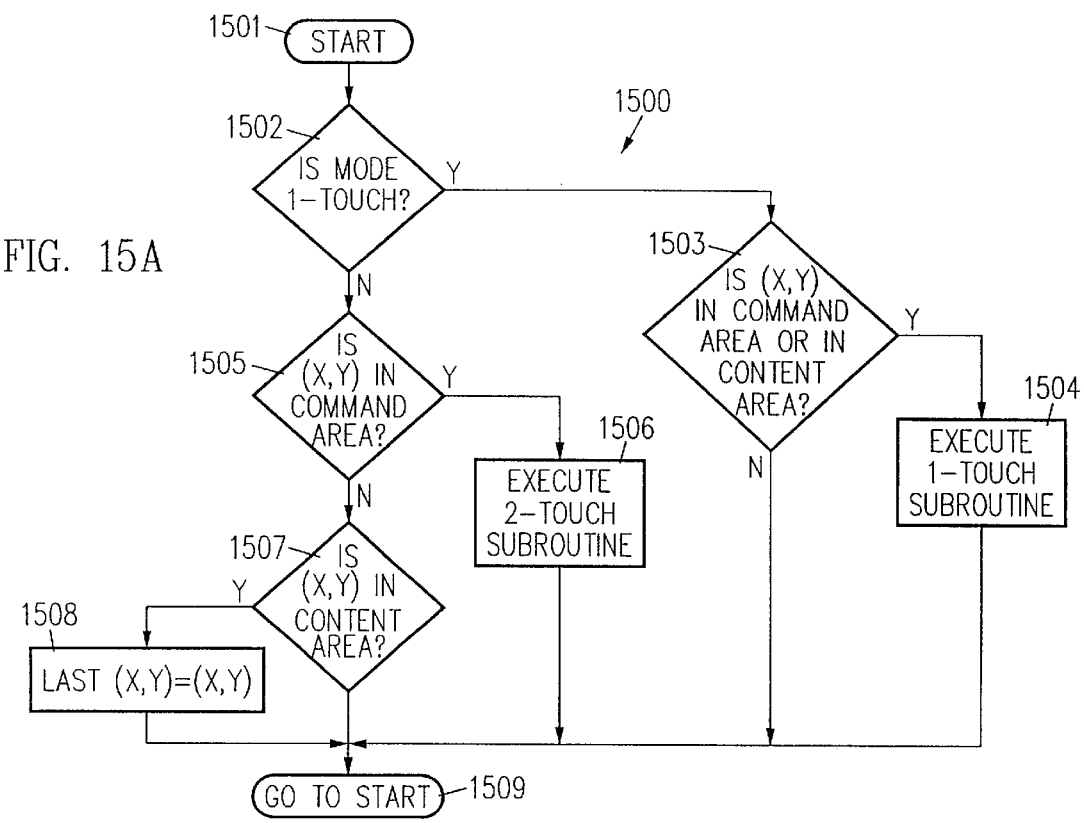
FIGS. 15A–15C illustrate, in flow charts, the steps performed by host device 120 (FIG. 2C) to implement two-touch method for selecting the information related to printed content on multiple leaves of printed publication.
Figure 15B:
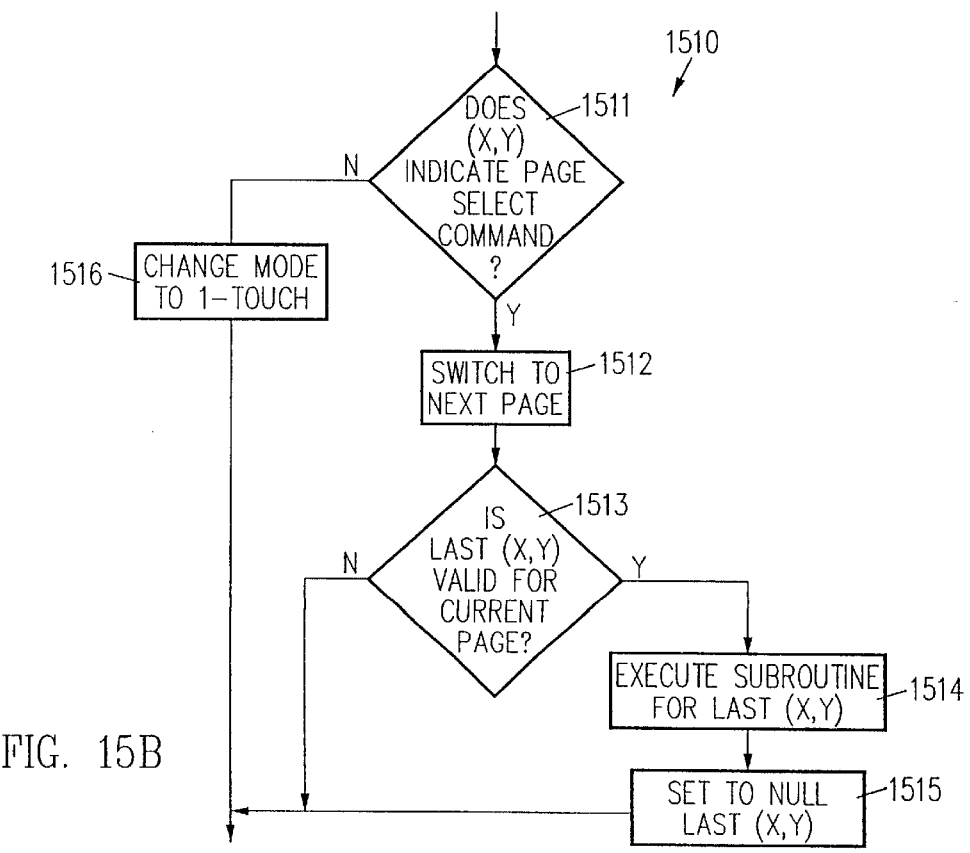

In one particular embodiment, host device 120 performs the method 1500 (FIG. 15A) to implement the two-touch method described above in reference to marks 523A–523N and 543A–543N. Specifically, host device 120 starts in step 1501, and goes to step 1502. In step 1502 host device 120 checks if variable "mode" is set to indicate operation of, for example, remote control 550 in the 1-touch mode (wherein all touches by the user are processed immediately by host device 120). If so, host device 120 goes to step 1503 and checks if the coordinates (x,y) of a touched location fall within a command area AR (FIG. 5J) or fall within a content area formed by one of areas A1–A7. If so, host device 120 goes to step 1504 to execute 1-touch subroutine 1510 (illustrated in FIG. 15B). Thereafter, host device 120 goes to step 1509 and returns to the start step 1501.

Figure 15C:
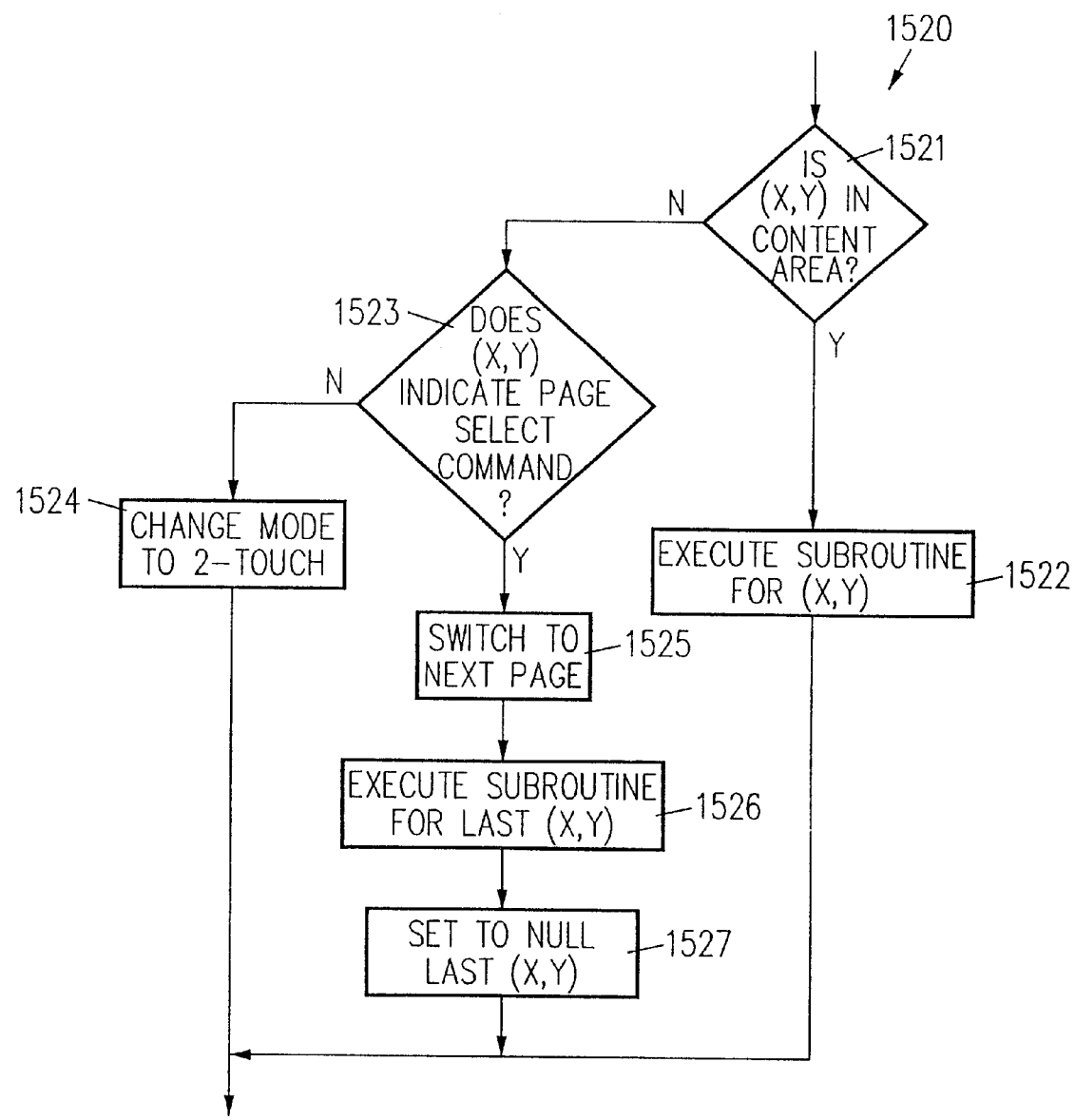

In step 1502, if the variable "mode" is not set to the 1-touch mode, host device 120 goes to step 1505 and checks if the coordinates (x,y) of the touched location fall within the command area AR (FIG. 5J). If so, host device 120 goes to step 1506 and executes a 2-touch subroutine 1520 (described below in reference to FIG. 15C). In step 1505, if the decision is no, host device 120 goes to step 1507 to check if the coordinates (x,y) of the touched location fall within content area such as one of areas A1–A7. If so, host device 120 goes to step 1508 and sets previously saved (x,y) coordinates (also called "last (x,y)" coordinates) to be the current (x,y) coordinates. Thereafter host device 120 goes to step 1509 and returns to step 1501.

In 1-touch subroutine 1510, host device 120 checks if the coordinates (x,y) indicate a command (also called "page select command") to select a page (in step 1511), for example by looking up a table (as described above). If so, host device 120 goes to step 1512 and switches to a new page as indicated by the table. Next, host device 120 goes to step 1513 and checks if the last (x,y) coordinates are valid for the current page. If so, host device 120 goes to step 1514 and executes a subroutine indicated by the table for the last (x,y) coordinates, e.g. to display the selected information. Next, host device 120 goes to step 1515 and sets to null the last (x,y) coordinates, and exits the subroutine. If in step 1513, the decision is no, host device 120 exits the subroutine. In step 1511, if the decision is no, host device 120 goes to step 1516 and changes the variable mode to be 1-touch, and thereafter exits the subroutine.

In 2-touch subroutine 1520, host device 120 checks to see if the coordinates (x,y) fall within the content area, e.g. one of areas A1–A7. If so, host device 120 goes to step 1522 and executes a subroutine indicated by the table for the (x,y) coordinates, e.g. displays a letter of the alphabet indicated by a key in a keyboard. Thereafter, host device 120 exits the subroutine 1520.

In step 1521, if the answer is no, host device 120 goes to step 1523 and checks if the (x,y) coordinates indicate (via the table) a page select command. If so, host device 120 goes to step 1525 and switches to a new page as indicated by the table. Next, host device 120 goes to step 1526 and executes a subroutine indicated by the table for the last (x,y) coordinates. Next, host device 120 goes to step 1527 and sets to null the last (x,y) coordinates, and exits the subroutine. In step 1523, if the decision is no, host device 120 goes to step 1524 and changes the variable mode to indicate the two-touch mode, and then exits the subroutine.

Numerous variations and modifications will be obvious to a person of skill in the art of remote controls in view of the disclosure.

Therefore, in an alternative embodiment, the information to be displayed is not retrieved from a storage media. Instead, wireless signal 111 (aB) causes host device 140 to display a currently broadcast TV program on a channel identified by the touched location in the remote control. Therefore, in the alternative embodiment, touching a description of the TV program "HOME IMPROVEMENT" printed in a magazine "TV GUIDE™" mounted on a remote control base as described herein causes host device 120 to automatically switch to a channel that currently carries the TV program "HOME IMPROVEMENT". If no channel carries a selected TV program, host device 120 displays an appropriate error message, e.g. "PLEASE TUNE IN AT 7:30 P.M. FOR HOME IMPROVEMENT".

Also, although leaf 11 is illustrated as having only one code, leaf 11 can have additional codes, e.g. at edge 11F to be read by identity reader 23 when leaf 11 is flipped over sideways and inserted with edge 11F adjacent to reader 23. Moreover, in one embodiment, base 32 includes batteries (not shown) of the "stick-on peel-off" type as described in U.S. patent application Ser. No. 08/692,994 incorporated by reference above.

Furthermore, although in one embodiment printed publication 11 is a periodical, in another embodiment, printed publication is a children's picture book. Moreover, although in the above-described embodiment, there is a reserved area AR on each leaf, in an alternative embodiment marks 114A–114M are interspersed among various touch sensitive areas with no touch sensitive area overlapping any of marks 114A–114M, and none of marks 114A–114M overlapping each other. In the alternative embodiment if touch sensitive areas overlap, identity of a touched area is resolved from the identity of the leaves currently in use as described above.

Moreover, although not described above, a remote control base 32 (FIG. 1) can have (in addition to the above-described button(s) 12) buttons labeled with printed content on the button's surface, e.g. buttons labeled "1", "2", . . . "0", "SKIP", "REPEAT", "INFO", "←", "→" as described in U.S. patent application, Ser. No. 08/550,976 incorporated by reference above (see FIG. 6H and the related description).

Furthermore, although certain fasteners are described above (e.g. rails 104 and 112, clip 502, sleeve 521, and channels 531–532), other fasteners can also be used. Hence, in another embodiment, the base has the form of a normal three ring binder (not shown), and the attached printed publication has three holes adjacent to the spine. In yet another embodiment, the base has the form of a manila file folder (not shown) having a clip at the top edge of the inner side of the back cover of the folder.

Furthermore, although LED 105 (FIG. 2A) has been described above as an infrared LED, in another embodiment, LED is a diffused laser diode as described in U.S. patent application, Ser. No. 08/908,833 that is a continuation of Ser. No. 08/298,648 both referenced above.

Moreover, although in one embodiment substrates 601 and 602 are formed of MYLAR, substrates 601 and 602 can be formed of other materials such as paper or LDPE plastic in other embodiments. Furthermore, although in some embodiments a leaf 11 (FIG. 2B) lies over one or more button(s) in base 32, in another embodiment, a base (not shown) has two touch sensitive strips, e.g. one on channel 35 and another on channel 38 (FIG. 2A). In such an embodiment, the user operates the remote control by touching each of the strips once thereby to indicate the two cartesian coordinates to determine the position of content on leaf 11.

Note that although remote control circuit 700, and a host device 120 have been described briefly above in one embodiment of the invention, such a remote control circuit and a host device are described in detail in related applications incorporated by reference above, for example the U.S. patent application, Ser. No. 08/816,616 filed on Mar. 12, 1997.

Various modifications and adaptations of the above-described embodiments are covered by the attached claims.

What is claimed is:

1. A remote control comprising:

a file folder including a front cover, a back cover and a spine located between said front cover and said back cover, said file folder further including a fastener mounted on said spine, said fastener being capable of detachably holding a printed publication, said printed publication devoid of electronic components permanently attached to said printed publication;

a remote control circuit supported by said file folder; and a button supported on at least one of said front cover and said back cover and coupled to said remote control circuit;

a plurality of leaves of the printed publication detachably attached to said fastener so that a leaf is laid over said button, said leaf being sufficiently thin for pressure on said leaf to transfer through said leaf to operate said button;

wherein said remote control circuit transmits a remote control signal to a host device in response to application of pressure to said button, said remote control signal identifying a location on the leaf where the pressure is applied.

2. The remote control of claim 1 wherein:

said remote control has the appearance of a normal ring binder.

3. The remote control of claim 1 wherein:

said button includes a touch panel capable of indicating the location of application of said pressure.

4. The remote control of claim 3, wherein said touch panel is supported by said back cover, the remote control further comprising:

another touch panel supported by said front cover and coupled to said remote control circuit.

5. The remote control of claim 1 wherein:

said button includes a switch in a plurality of discrete switches mounted on said back cover;

an internal surface of said back cover is substantially planar; and said base has the appearance of a normal ring binder.

6. The remote control of claim 1 further comprising:

information in the form of electronic content identified at least partially by said signal, said electronic content being related to content printed on said leaf.

* * * * *